(12) United States Patent
Okano

(10) Patent No.: US 9,001,438 B2
(45) Date of Patent: Apr. 7, 2015

(54) IMAGING LENS AND IMAGING DEVICE

(75) Inventor: Hideaki Okano, Aichi (JP)

(73) Assignee: Sony Corporation, Tokyo (JP)

( * ) Notice: Subject to any disclaimer, the term of this patent is extended or adjusted under 35 U.S.C. 154(b) by 177 days.

(21) Appl. No.: 13/805,598

(22) PCT Filed: Jun. 10, 2011

(86) PCT No.: PCT/JP2011/063865
§ 371 (c)(1),
(2), (4) Date: Dec. 19, 2012

(87) PCT Pub. No.: WO2012/002167
PCT Pub. Date: Jan. 5, 2012

(65) Prior Publication Data
US 2013/0100546 A1    Apr. 25, 2013

(30) Foreign Application Priority Data
Jun. 28, 2010   (JP) .................... 2010-146742

(51) Int. Cl.
*G02B 9/60*   (2006.01)
*G02B 13/00*   (2006.01)

(52) U.S. Cl.
CPC .............. *G02B 9/60* (2013.01); *G02B 13/0045* (2013.01)

(58) Field of Classification Search
CPC ....................................................... G02B 9/60
USPC ......................................................... 359/767
See application file for complete search history.

(56) References Cited

U.S. PATENT DOCUMENTS

2012/0075721 A1*  3/2012  Konishi et al. ............... 359/708

FOREIGN PATENT DOCUMENTS

| CN | 101620311 A | 1/2010 |
| JP | 61-50110 | 3/1986 |
| JP | 2002-365530 A | 12/2002 |

(Continued)

OTHER PUBLICATIONS

International Search Report; International Application No. PCT/JP2011/063865; International Filing Date: Jun. 10, 2011. Form PCT/ISA/210.

(Continued)

*Primary Examiner* — James Jones
(74) *Attorney, Agent, or Firm* — Hazuki International, LLC

(57) ABSTRACT

The present invention is to provide an imaging lens and an imaging device that achieve optical performance high enough for high-pixel imaging elements, and have the smallest possible sizes and thicknesses.

A first lens having positive refractive power, an aperture stop, a second lens having positive or negative refractive power, a third lens having negative refractive power, a fourth lens having positive refractive power, and a fifth lens having negative refractive power are provided in this order from the object side, and the following conditional expressions (1), (2), and (3) are satisfied: (1) $0.80 < f_1/f < 1.40$, (2) $|f_1/f_3| < 1.50$, and (3) $-0.20 < f_1/f_2 < 0.90$, where f represents the focal length of the entire lens system, $f_1$ represents the focal length of the first lens, $f_2$ represents the focal length of the second lens, and $f_3$ represents the focal length of the third lens.

7 Claims, 15 Drawing Sheets

(56) References Cited

FOREIGN PATENT DOCUMENTS

| | | |
|---|---|---|
| JP | 2004-004566 A | 1/2004 |
| JP | 2006-293324 A | 10/2006 |
| JP | 2009-294527 A | 12/2009 |
| JP | 2010-026434 A | 2/2010 |
| JP | 2010-079296 | 4/2010 |
| WO | WO-2010/024198 | 3/2010 |

OTHER PUBLICATIONS

Written Opinion of the International Searching Authority; International Application No. PCT/JP2011/063865; International Filing Date: Jun. 10, 2011. Form PCT/ISA/220 and PCT/ISA/237.

Chinese Office Action issued May 23, 2014 for corresponding Chinese Application No. 201180030887.3.

* cited by examiner

IMAGING LENS AND IMAGING DEVICE

TECHNICAL FIELD

The present invention relates to an imaging lens and an imaging device. More particularly, the present invention relates to an imaging lens suitable for a small-sized imaging device such as a digital still camera or a camera-equipped portable telephone device, which uses a solid-state imaging element such as a CCD (Charge Coupled Device) or a CMOS (Complementary Metal Oxide Semiconductor), and an imaging device using the imaging lens.

BACKGROUND ART

There have been generally-known imaging devices such as camera-equipped portable telephone devices and digital still cameras that use approximately 3- or 5-million pixel solid-state imaging elements such as CCDs or CMOSs, and have imaging lenses of an aperture Fno of approximately 2.8 mounted thereon.

Such imaging devices are now required to be even smaller in size, and the imaging lenses mounted on those imaging devices are required to have smaller sizes and shorter total optical lengths than ever.

In recent years, in small-sized imaging devices such as camera-equipped portable telephone devices, imaging elements have become smaller and become capable of coping with a larger number of pixels. Models with high-pixel imaging elements almost equivalent to digital still cameras have become popular. Therefore, the imaging lenses mounted on small-sized imaging devices are required to have high lens performance suitable for such high-pixel solid-state imaging devices.

Further, there is a demand for lenses with brighter aperture Fno, to prevent image quality degradation due to noise caused when an image is captured in a dark place. Each of such small-sized and high-performance imaging lenses needs to have a four-lens structure or a structure with more lenses. (see Patent Documents 1 through 5, for example)

CITATION LIST

Patent Documents

Patent Document 1: Japanese Patent Application Laid-Open No. 2004-4566
Patent Document 2: Japanese Patent Application Laid-Open No. 2002-365530
Patent Document 3: Japanese Patent Application Laid-Open No. 2006-293324
Patent Document 4: Japanese Patent Application Laid-Open No. 2009-294527
Patent Document 5: Japanese Patent Application Laid-Open No. 2010-26434

SUMMARY OF THE INVENTION

The conventional lens disclosed in Patent Document 1 has a three-lens structure, which is the most advantageous structure in shortening the total optical length. In recent years, however, there is a demand for lenses with high resolving power and small chromatic aberration, as imaging elements involve a large number of pixels. To achieve both of the features, a lens with a three-lens structure does not have enough lenses to correct aberration, and it is difficult to achieve desired optical performance with such a three-lens structure.

The conventional lens disclosed in Patent Document 2 has a four-lens structure. This conventional lens corrects various aberrations in a preferred manner, but the total optical length thereof is too long to achieve a small size. Also, in the lens disclosed in Patent Document 2, the power of the first lens and the power of the second lens are very strong. Since the power of the second lens is particularly strong, sensitivity in manufacture is very high, resulting in a decrease in productivity.

Further, in the lens disclosed in Patent Document 2, there is large adverse influence of spherical aberrations and coma aberrations that occur when the aperture Fno is made brighter due to the strong power of the first lens, and it is particularly difficult to maintain high performance at the peripheral portion.

The conventional lens disclosed in Patent Document 3 has a four-lens structure, and has a high level of aberration correction capability. However, the total length of the lens is too large to achieve a small size. Also, in the lens disclosed in Patent Document 3, both surfaces of the third lens have convex shapes. Therefore, it is difficult to correct aberrations with this lens, and sensitivity in manufacture is high.

Further, when a peripheral light beam is totally-reflected by the lens disclosed in Patent Document 3, the totally-reflected peripheral light beam is further reflected by another surface, and enters an imaging element. As a result, ghosts might be formed and greatly degrade image quality.

The conventional lens disclosed in Patent Document 4 has a five-lens structure, and has a high level of aberration correction capability. However, the total length of the lens is also too large to achieve a small size. This lens disclosed in Patent Document 4 is formed basically by adding a correcting lens to a lens having a four-lens structure. If the total optical length is shortened, the power of the first lens becomes too strong. As a result, aberrations such as spherical aberrations and coma aberrations that occur in the first lens when the aperture Fno is made brighter cannot be corrected successfully.

The conventional lens disclosed in Patent Document 5 has a five-lens structure with a high level of aberration correction capability. However, the power of the first lens relative to the focal length of the entire system is weak, and effective reductions in size and height (thickness) are not achieved.

The present invention has been made in view of the above circumstances, and is to suggest a very small and thin imaging lens that achieves optical performance high enough for a high-pixel imaging element with 8 million pixels or more, and an imaging device.

To solve the above problems, an imaging lens of the present invention includes a first lens having positive refractive power, an aperture stop, a second lens having positive or negative refractive power, a third lens having negative refractive power, a fourth lens having positive refractive power, and a fifth lens having negative refractive power in this order from the object side. The imaging lens satisfies the following conditional expressions (1), (2), and (3):

$$0.80 < f_1/f < 1.40 \quad (1)$$

$$|f_1/f_3| < 1.50 \quad (2)$$

$$-0.20 < f_1/f_2 < 0.90 \quad (3)$$

where
f: the focal length of the entire lens system,
$f_1$: the focal length of the first lens, $f_2$: the focal length of the second lens, and
$f_3$: the focal length of the third lens.

Also, in the imaging lens, the following conditional expression (4) is satisfied:

$$(\nu d_1 + \nu d_2)/2 - \nu d_3 > 20 \quad (4)$$

where
$\nu d_1$: the Abbe number of the first lens,
$\nu d_2$: the Abbe number of the second lens, and
$\nu d_3$: the Abbe number of the third lens.

In the imaging lens, the relationship between the focal length of the entire lens system and the focal length of the fifth lens satisfies the following conditional expression (5):

$$0.5 < |f_5|/f < 1.8 \quad (5)$$

where
f: the focal length of the entire lens system, and
$f_5$: the focal length of the fifth lens.

The fundamental characteristics of this imaging lens lie in that the first lens having positive refractive power, the aperture stop, the second lens having positive or negative refractive power, the third lens having negative refractive power, the fourth lens having positive refractive power, and the fifth lens having negative refractive power are provided in this order from the object side, and that positive power is forward in the entire lens system.

In the imaging lens, if the total optical length is shortened to reduce the size, the curvature radius of a first lens having a four-lens structure becomes smaller, and the refractive power increases. As a result, spherical aberration correction becomes difficult. Also, in the imaging lens, if the lens aperture is made larger and Fno is made smaller (brighter) to achieve higher image quality, coma aberration correction becomes difficult.

To effectively correct spherical aberrations and coma aberrations that become larger as the size increases and the aperture becomes larger, the first lens having a four-lens structure is divided into two in the imaging lens. While the two divisional lenses (the first lens and the second lens) complement each other with power, the number of aberration correction planes is increased by two compared with that prior to the division.

With this arrangement in the imaging lens, spherical and coma aberrations that have occurred in the first lens are restrained by the second lens, and other aberrations can also be corrected by the two newly-formed correction planes.

Although separated in the imaging lens, the first lens and the second lens are located very close to each other, so that chromatic aberrations that have occurred in the first lens and the second lens can be offset by the third lens.

In the imaging lens, the aperture stop is provided between the first lens and the second lens that are separated. Accordingly, distortions can be more efficiently corrected than in a case where the aperture stop is located closer to the object side than the first lens is. This also contributes to a decrease in optical sensitivity, and assembling becomes easier in the manufacturing procedures.

The conditional expression (1) specified for the imaging lens is a conditional expression for specifying an appropriate power allocation to the first lens relative to the power of the entire lens system in such a lens structure.

If the upper limit value defined by the conditional expression (1) is exceeded, the power of the first lens becomes too large, and off-axis aberration correction, particularly astigmatism and field curvature correction, becomes difficult. As a result, easiness of assembling at the time of manufacture is reduced.

If the lower limit value defined by the conditional expression (1) is not reached, on the other hand, the power of the first lens becomes too weak to shorten the total optical length, and compactness might be reduced. In view of this, satisfying the conditional expression (1) is an essential condition in shortening the total optical length in the imaging lens.

The conditional expression (2) specified for this imaging lens concerns appropriate power allocations to the first lens and the third lens. An absolute value is used as the focal length of the third lens, because the third lens has negative power.

If the lower limit value defined by the conditional expression (2) is not reached, the power of the first lens becomes too strong. As a result, spherical aberration and off-axis coma aberration occurrences increase, and aberration correction becomes difficult.

If the upper limit value defined by the conditional expression (2) is exceeded, on the other hand, the power of the first lens becomes too weak to allow the first lens and the third lens to perform appropriate achromatizing. As a result, optical performance high enough for high-pixel imaging elements cannot be maintained. Also, in an imaging environment where a strong power source exists, color bleeding (flare) occurs, to adversely affect image quality.

Therefore, in the imaging lens, the conditional expression (2) is satisfied, so that the imaging lens is made even thinner than a conventional lens, and optical performance high enough for high-pixel imaging elements can be achieved.

Further, the conditional expression (3) specified for this imaging lens is a conditional expression that concerns appropriate power allocations to the first lens and the second lens.

If the lower limit value defined by this conditional expression (3) is not reached, the power of the second lens becomes too weak, and a large proportion of the load is put on the first lens. As a result, spherical aberration and off-axis coma aberration occurrences increase, and correcting the spherical aberration and the off-axis coma aberration becomes difficult. This also hinders achromatizing with the third lens, and therefore, optical performance high enough for high-pixel imaging elements cannot be maintained.

If the upper limit value defined by the conditional expression (3) is exceeded, on the other hand, the power of the second lens becomes too strong. As a result, sensitivity in manufacture becomes higher, and easiness of assembling is reduced at the time of manufacture.

Therefore, in the imaging lens, the conditional expression (3) is satisfied, so that optical performance high enough for high-pixel imaging elements can be achieved while the power allocations to the first lens and the second lens are optimized.

The conditional expression (4) specified for this imaging lens defines the Abbe numbers of the first through third lenses at a d-line single wavelength. Such a glass material that the Abbe number falls within the range defined by the conditional expression (4) is used for each of the first lens, the second lens, and the third lens, so that excellent chromatic aberration correction can be performed without a large increase in the power of each lens.

If the lower limit value defined by the conditional expression (4) is not reached in the imaging lens, color bleeding (flare) occurs to adversely affect image quality. If the conditional expression (4) is satisfied, the power of each lens does not become very strong. Accordingly, coma aberration and field curvature occurrences can be restrained in the surrounding area, and furthermore, sensitivity in manufacture can be effectively restrained.

Therefore, in the imaging lens, the conditional expression (4) is satisfied, so that excellent chromatic aberration correction can be performed, and coma aberration and field curvature occurrences are restrained in the surrounding area to lower the sensitivity in manufacture.

Further, the conditional expression (5) specified for this imaging lens is a conditional expression that concerns an appropriate power allocation to the fifth lens relative to the power of the entire lens system.

If the lower limit value defined by the conditional expression (5) is not reached, the power of the fifth lens becomes too strong. As a result, appropriate field correction (correction to achieve uniform resolving power from the axis to the surrounding area) becomes difficult. Also, optical sensitivity becomes higher, and easiness of assembling is reduced in manufacture.

If the upper limit value defined by the conditional expression (5) is exceeded, on the other hand, the power of the fifth lens becomes too weak, and appropriate aberration correction, particularly field correction (according to the Petzval's law), becomes difficult.

Therefore, in the imaging lens, the conditional expression (5) is satisfied, so that optical performance high enough for high-pixel imaging elements can be achieved while the power allocation to the fifth lens relative to the entire lens system is optimized.

In the imaging lens, the first lens has a convex surface facing the object side and has positive refractive power. Accordingly, an achromatizing effect can be achieved with the first lens, the second lens, and the third lens, while the refractive power is increased.

In the imaging lens, the third lens has a concave surface on the imaging plane side. Accordingly, even when an off-axis light beam is totally-reflected by the concave surface, the totally-reflected off-axis light beam diffuses to the lens peripheral portion and is prevented from directly entering a solid-state imaging element such as a CCD or CMOS. Thus, formation of ghosts can be prevented.

In the imaging lens, the third lens has the concave surface on the imaging plane side, to effectively correct field curvatures and coma aberrations. Further, in the imaging lens, the fourth lens has a meniscus shape with positive power, to effectively correct aberrations, particularly field curvatures and astigmatisms.

Further, in the imaging lens, the second lens has a convex surface facing the imaging plane side and has positive or negative refractive power. Accordingly, an achromatizing effect can be achieved with the second lens and the third lens.

In the imaging lens, the above described conditions are satisfied, so that contrast degradation due to ghosts and flares can be reduced, and optical performance high enough for high-pixel imaging elements can be achieved, while the imaging lens is made very small and thin.

An imaging device of the present invention includes an imaging lens, and an imaging element that converts an optical image formed by the imaging lens into an electrical signal. The imaging lens includes a first lens having positive refractive power, an aperture stop, a second lens having positive or negative refractive power, a third lens having negative refractive power, a fourth lens having positive refractive power, and a fifth lens having negative refractive power in this order from the object side. The imaging lens satisfies the following conditional expressions (1), (2), and (3):

$$0.80 < f_1/f < 1.40 \quad (1)$$

$$|f_1/f_3| < 1.50 \quad (2)$$

$$-0.20 < f_1/f_2 < 0.90 \quad (3)$$

where
f: the focal length of the entire lens system,
$f_1$: the focal length of the first lens,
$f_2$: the focal length of the second lens, and
$f_3$: the focal length of the third lens.

The fundamental characteristics of the imaging lens in this imaging device lie in that the first lens having positive refractive power, the aperture stop, the second lens having positive or negative refractive power, the third lens having negative refractive power, the fourth lens having positive refractive power, and the fifth lens having negative refractive power are provided in this order from the object side, and that positive power is forward in the entire lens system.

In the imaging lens, if the total optical length is shortened to reduce the size, the curvature radius of a first lens having a four-lens structure becomes smaller, and the refractive power increases. As a result, spherical aberration correction becomes difficult. Also, in the imaging lens, if the lens aperture is made larger and Fno is made smaller (brighter) to achieve higher image quality, coma aberration correction becomes difficult.

To effectively correct spherical aberrations and coma aberrations that become larger as the size increases and the aperture becomes larger, the first lens having a four-lens structure is divided into two in the imaging lens. While the two divisional lenses (the first lens and the second lens) complement each other with power, the number of aberration correction planes is increased by two compared with that prior to the division.

With this arrangement in the imaging lens, spherical and coma aberrations that have occurred in the first lens are restrained by the second lens, and other aberrations can also be corrected by the two newly-formed correction planes.

Although separated in the imaging lens, the first lens and the second lens are located very close to each other, so that chromatic aberrations that have occurred in the first lens and the second lens can be offset by the third lens.

In the imaging lens, the aperture stop is provided between the first lens and the second lens that are separated. Accordingly, distortions can be more efficiently corrected than in a case where the aperture stop is located closer to the object side than the first lens is. This also contributes to a decrease in optical sensitivity, and assembling becomes easier in the manufacturing procedures.

The conditional expression (1) specified for the imaging lens is a conditional expression for specifying an appropriate power allocation to the first lens relative to the power of the entire lens system in such a lens structure.

If the upper limit value defined by the conditional expression (1) is exceeded, the power of the first lens becomes too large, and off-axis aberration correction, particularly astigmatism and field curvature correction, becomes difficult. As a result, easiness of assembling at the time of manufacture is reduced.

If the lower limit value defined by the conditional expression (1) is not reached, on the other hand, the power of the first lens becomes too weak to shorten the total optical length, and compactness might be reduced. In view of this, satisfying the conditional expression (1) is an essential condition in shortening the total optical length in the imaging lens.

The conditional expression (2) specified for this imaging lens concerns appropriate power allocations to the first lens and the third lens. An absolute value is used as the focal length of the third lens, because the third lens has negative power.

If the lower limit value defined by the conditional expression (2) is not reached, the power of the first lens becomes too strong. As a result, spherical aberration and off-axis coma aberration occurrences increase, and aberration correction becomes difficult.

If the upper limit value defined by the conditional expression (2) is exceeded, on the other hand, the power of the first lens becomes too weak to allow the first lens and the third lens to perform appropriate achromatizing. As a result, optical performance high enough for high-pixel imaging elements cannot be maintained. Also, in an imaging environment where a strong power source exists, color bleeding (flare) occurs, to adversely affect image quality.

Therefore, in the imaging lens, the conditional expression (2) is satisfied, so that the imaging lens is made even thinner than a conventional lens, and optical performance high enough for high-pixel imaging elements can be achieved.

Further, the conditional expression (3) specified for this imaging lens is a conditional expression that concerns appropriate power allocations to the first lens and the second lens.

If the lower limit value defined by this conditional expression (3) is not reached, the power of the second lens becomes too weak, and a large proportion of the load is put on the first lens. As a result, spherical aberration and off-axis coma aberration occurrences increase, and correcting the spherical aberration and the off-axis coma aberration becomes difficult. This also hinders achromatizing with the third lens, and therefore, optical performance high enough for high-pixel imaging elements cannot be maintained.

If the upper limit value defined by the conditional expression (3) is exceeded, on the other hand, the power of the second lens becomes too strong. As a result, sensitivity in manufacture becomes higher, and easiness of assembling is reduced at the time of manufacture.

Therefore, in the imaging lens, the conditional expression (3) is satisfied, so that optical performance high enough for high-pixel imaging elements can be achieved while the power allocations to the first lens and the second lens are optimized.

According to the present invention, an imaging lens includes a first lens having positive refractive power, an aperture stop, a second lens having positive or negative refractive power, a third lens having negative refractive power, a fourth lens having positive refractive power, and a fifth lens having negative refractive power in this order from the object side. The imaging lens satisfies the following conditional expressions (1), (2), and (3):

$$0.80 < f_1/f < 1.40 \quad (1)$$

$$|f_1/f_3| < 1.50 \quad (2)$$

$$-0.20 < f_1/f_2 < 0.90 \quad (3)$$

where
f: the focal length of the entire lens system,
$f_1$: the focal length of the first lens,
$f_2$: the focal length of the second lens, and
$f_3$: the focal length of the third lens.

The fundamental characteristics of this imaging lens lie in that the first lens having positive refractive power, the aperture stop, the second lens having positive or negative refractive power, the third lens having negative refractive power, the fourth lens having positive refractive power, and the fifth lens having negative refractive power are provided in this order from the object side, and that positive power is forward in the entire lens system.

In the imaging lens, if the total optical length is shortened to reduce the size, the curvature radius of a first lens having a four-lens structure becomes smaller, and the refractive power increases. As a result, spherical aberration correction becomes difficult. Also, in the imaging lens, if the lens aperture is made larger and Fno is made smaller (brighter) to achieve higher image quality, coma aberration correction becomes difficult.

To effectively correct spherical aberrations and coma aberrations that become larger as the size increases and the aperture becomes larger, the first lens having a four-lens structure is divided into two in the imaging lens. While the two divisional lenses (the first lens and the second lens) complement each other with power, the number of aberration correction planes is increased by two compared with that prior to the division.

With this arrangement in the imaging lens, spherical and coma aberrations that have occurred in the first lens are restrained by the second lens, and other aberrations can also be corrected by the two newly-formed correction planes.

Although separated in the imaging lens, the first lens and the second lens are located very close to each other, so that chromatic aberrations that have occurred in the first lens and the second lens can be offset by the third lens.

In the imaging lens, the aperture stop is provided between the first lens and the second lens that are separated. Accordingly, distortions can be more efficiently corrected than in a case where the aperture stop is located closer to the object side than the first lens is. This also contributes to a decrease in optical sensitivity, and assembling becomes easier in the manufacturing procedures.

The conditional expression (1) specified for the imaging lens is a conditional expression for specifying an appropriate power allocation to the first lens relative to the power of the entire lens system in such a lens structure.

If the upper limit value defined by the conditional expression (1) is exceeded, the power of the first lens becomes too large, and off-axis aberration correction, particularly astigmatism and field curvature correction, becomes difficult. As a result, easiness of assembling at the time of manufacture is reduced.

If the lower limit value defined by the conditional expression (1) is not reached, on the other hand, the power of the first lens becomes too weak to shorten the total optical length, and compactness might be reduced. In view of this, satisfying the conditional expression (1) is an essential condition in shortening the total optical length in the imaging lens.

The conditional expression (2) specified for this imaging lens concerns appropriate power allocations to the first lens and the third lens. An absolute value is used as the focal length of the third lens, because the third lens has negative power.

If the lower limit value defined by the conditional expression (2) is not reached, the power of the first lens becomes too strong. As a result, spherical aberration and off-axis coma aberration occurrences increase, and aberration correction becomes difficult.

If the upper limit value defined by the conditional expression (2) is exceeded, on the other hand, the power of the first lens becomes too weak to allow the first lens and the third lens to perform appropriate achromatizing. As a result, optical performance high enough for high-pixel imaging elements cannot be maintained. Also, in an imaging environment where a strong power source exists, color bleeding (flare) occurs, to adversely affect image quality.

Therefore, in the imaging lens, the conditional expression (2) is satisfied, so that the imaging lens is made even thinner than a conventional lens, and optical performance high enough for high-pixel imaging elements can be achieved.

Further, the conditional expression (3) specified for this imaging lens is a conditional expression that concerns appropriate power allocations to the first lens and the second lens.

If the lower limit value defined by this conditional expression (3) is not reached, the power of the second lens becomes too weak, and a large proportion of the load is put on the first lens. As a result, spherical aberration and off-axis coma aberration occurrences increase, and correcting the spherical aberration and the off-axis coma aberration becomes difficult. This also hinders achromatizing with the third lens, and therefore, optical performance high enough for high-pixel imaging elements cannot be maintained.

If the upper limit value defined by the conditional expression (3) is exceeded, on the other hand, the power of the second lens becomes too strong. As a result, sensitivity in manufacture becomes higher, and easiness of assembling is reduced at the time of manufacture.

Therefore, in the imaging lens, the conditional expression (3) is satisfied, so that optical performance high enough for high-pixel imaging elements can be achieved while the power allocations to the first lens and the second lens are optimized.

According to the present invention, an imaging device includes an imaging lens, and an imaging element that converts an optical image formed by the imaging lens into an electrical signal. The imaging lens includes a first lens having positive refractive power, an aperture stop, a second lens having positive or negative refractive power, a third lens having negative refractive power, a fourth lens having positive refractive power, and a fifth lens having negative refractive power in this order from the object side. The imaging lens satisfies the following conditional expressions (1), (2), and (3):

$$0.80 < f_1/f < 1.40 \quad (1)$$

$$|f_1/f_3| < 1.50 \quad (2)$$

$$-0.20 < f_1/f_2 < 0.90 \quad (3)$$

where
f: the focal length of the entire lens system,
$f_1$: the focal length of the first lens,
$f_2$: the focal length of the second lens, and
$f_3$: the focal length of the third lens.

The fundamental characteristics of the imaging lens in this imaging device lie in that the first lens having positive refractive power, the aperture stop, the second lens having positive or negative refractive power, the third lens having negative refractive power, the fourth lens having positive refractive power, and the fifth lens having negative refractive power are provided in this order from the object side, and that positive power is forward in the entire lens system.

The fundamental characteristics of the imaging lens in this imaging device lie in that the first lens having positive refractive power, the aperture stop, the second lens having positive or negative refractive power, the third lens having negative refractive power, the fourth lens having positive refractive power, and the fifth lens having negative refractive power are provided in this order from the object side, and that positive power is forward in the entire lens system.

In the imaging lens, if the total optical length is shortened to reduce the size, the curvature radius of a first lens having a four-lens structure becomes smaller, and the refractive power increases. As a result, spherical aberration correction becomes difficult. Also, in the imaging lens, if the lens aperture is made larger and Fno is made smaller (brighter) to achieve higher image quality, coma aberration correction becomes difficult.

To effectively correct spherical aberrations and coma aberrations that become larger as the size increases and the aperture becomes larger, the first lens having a four-lens structure is divided into two in the imaging lens. While the two divisional lenses (the first lens and the second lens) complement each other with power, the number of aberration correction planes is increased by two compared with that prior to the division.

With this arrangement in the imaging lens, spherical and coma aberrations that have occurred in the first lens are restrained by the second lens, and other aberrations can also be corrected by the two newly-formed correction planes.

Although separated in the imaging lens, the first lens and the second lens are located very close to each other, so that chromatic aberrations that have occurred in the first lens and the second lens can be offset by the third lens.

In the imaging lens in the imaging device, the aperture stop is provided between the first lens and the second lens that are separated. Accordingly, distortions can be more efficiently corrected than in a case where the aperture stop is located closer to the object side than the first lens is. This also contributes to a decrease in optical sensitivity, and assembling becomes easier in the manufacturing procedures.

The conditional expression (1) specified for the imaging lens is a conditional expression for specifying an appropriate power allocation to the first lens relative to the power of the entire lens system in such a lens structure.

If the upper limit value defined by the conditional expression (1) is exceeded, the power of the first lens becomes too large, and off-axis aberration correction, particularly astigmatism and field curvature correction, becomes difficult. As a result, easiness of assembling at the time of manufacture is reduced.

If the lower limit value defined by the conditional expression (1) is not reached, on the other hand, the power of the first lens becomes too weak to shorten the total optical length, and compactness might be reduced. In view of this, satisfying the conditional expression (1) is an essential condition in shortening the total optical length in the imaging lens.

The conditional expression (2) specified for this imaging lens concerns appropriate power allocations to the first lens and the third lens. An absolute value is used as the focal length of the third lens, because the third lens has negative power.

If the lower limit value defined by the conditional expression (2) is not reached, the power of the first lens becomes too strong. As a result, spherical aberration and off-axis coma aberration occurrences increase, and aberration correction becomes difficult.

If the upper limit value defined by the conditional expression (2) is exceeded, on the other hand, the power of the first lens becomes too weak to allow the first lens and the third lens to perform appropriate achromatizing. As a result, optical performance high enough for high-pixel imaging elements cannot be maintained. Also, in an imaging environment where a strong power source exists, color bleeding (flare) occurs, to adversely affect image quality.

Therefore, in the imaging lens in the imaging device, the conditional expression (2) is satisfied, so that the imaging lens is made even thinner than a conventional lens, and optical performance high enough for high-pixel imaging elements can be achieved.

Further, the conditional expression (3) specified for this imaging lens is a conditional expression that concerns appropriate power allocations to the first lens and the second lens.

If the lower limit value defined by this conditional expression (3) is not reached, the power of the second lens becomes too weak, and a large proportion of the load is put on the first lens. As a result, spherical aberration and off-axis coma aberration occurrences increase, and correcting the spherical aberration and the off-axis coma aberration becomes difficult.

This also hinders achromatizing with the third lens, and therefore, optical performance high enough for high-pixel imaging elements cannot be maintained.

If the upper limit value defined by the conditional expression (3) is exceeded, on the other hand, the power of the second lens becomes too strong. As a result, sensitivity in manufacture becomes higher, and easiness of assembling is reduced at the time of manufacture.

Therefore, in the imaging lens in the imaging device, the conditional expression (3) is satisfied, so that optical performance high enough for high-pixel imaging elements can be achieved while the power allocations to the first lens and the second lens are optimized.

MODES FOR CARRYING OUT THE INVENTION

Figure 1:
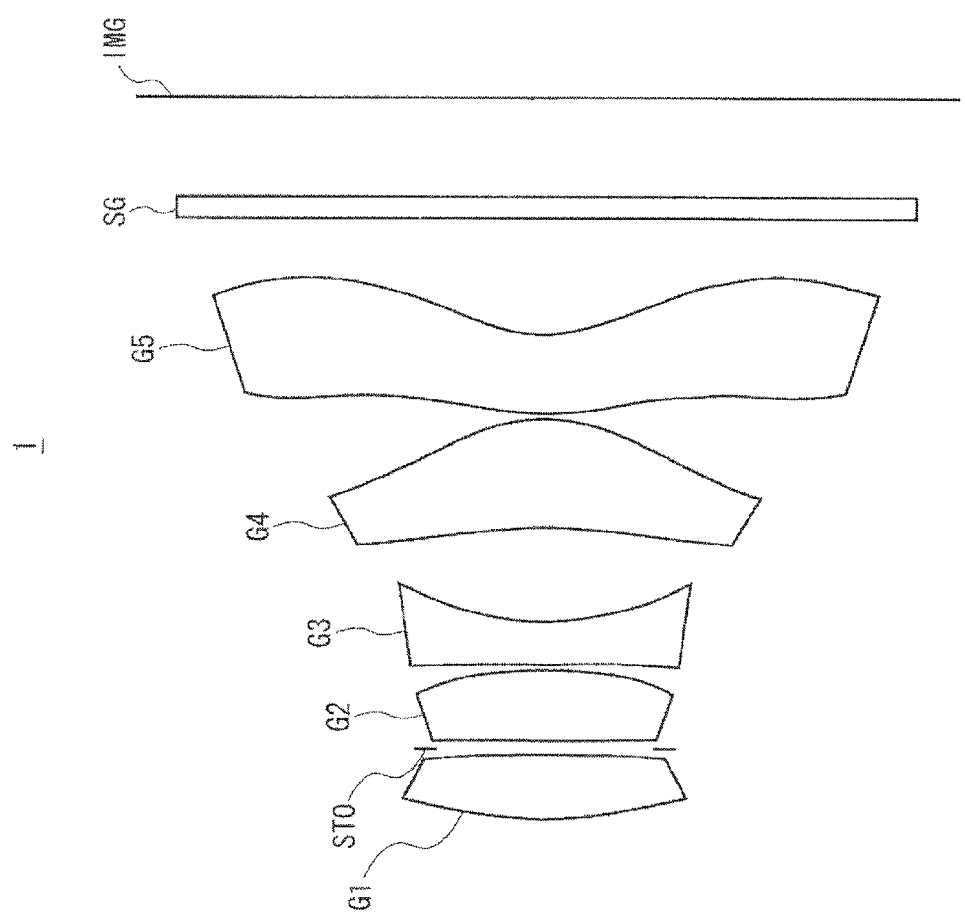
FIG. 1 is a schematic cross-sectional diagram showing the structure of an imaging lens in a first numerical example.

The following is a description of embodiments for carrying out the invention. Explanation will be made in the following order.
1. Embodiment
2. Numerical Examples According to the Embodiment (First through Sixth Numerical Examples)
3. Structures of an Imaging Device and a Portable Telephone Device
4. Other Embodiments

1. Embodiment

[1-1. Structure of an Imaging Lens]

In an imaging lens of the present invention, a first lens having positive refractive power, an aperture stop, a second lens having positive or negative refractive power, a third lens having negative refractive power, a fourth lens having positive refractive power, and a fifth lens having negative refractive power are provided in this order from the object side, and positive power is forward in the entire lens system.

In this imaging lens, if the total optical length is shortened to reduce the size, the curvature radius of a first lens having a four-lens structure becomes smaller, and the refractive power increases. As a result, spherical aberration correction becomes difficult. Also, in the imaging lens, if the lens aperture is made larger and Fno is made smaller (brighter) to achieve higher image quality, coma aberration correction becomes difficult.

To effectively correct spherical aberrations and coma aberrations that become larger as the size increases and the aperture becomes larger, the first lens having a four-lens structure is divided into two in the imaging lens. While the two divisional lenses (the first lens and the second lens) complement each other with power, the number of aberration correction planes is increased by two compared with that prior to the division.

With this arrangement in the imaging lens, spherical and coma aberrations that have occurred in the first lens are restrained by the second lens, and other aberrations can also be corrected by the two newly-formed correction planes.

Although separated in the imaging lens, the first lens and the second lens are located very close to each other, so that chromatic aberrations that have occurred in the first lens and the second lens can be offset by the third lens.

In the imaging lens, the aperture stop is provided between the first lens and the second lens that are separated. Accordingly, distortions can be more efficiently corrected than in a case where the aperture stop is located closer to the object side than the first lens is. This also contributes to a decrease in optical sensitivity, and assembling becomes easier in the manufacturing procedures.

Also, in this imaging lens, it is preferable to satisfy the following conditional expressions (1), (2), and (3):

$$0.80 < f_1/f < 1.40 \qquad (1)$$

$$|f_1/f_3| < 1.50 \qquad (2)$$

$$-0.20 < f_1/f_2 < 0.90 \qquad (3)$$

where
f: the focal length of the entire lens system,
$f_1$: the focal length of the first lens,
$f_2$: the focal length of the second lens, and
$f_3$: the focal length of the third lens.

The conditional expression (1) specified for the imaging lens is a conditional expression for specifying an appropriate power allocation to the first lens relative to the power of the entire lens system in such a lens structure.

If the upper limit value defined by the conditional expression (1) is exceeded, the power of the first lens becomes too large, and off-axis aberration correction, particularly astigmatism and field curvature correction, becomes difficult. As a result, easiness of assembling at the time of manufacture is reduced.

If the lower limit value defined by the conditional expression (1) is not reached, on the other hand, the power of the first lens becomes too weak to shorten the total optical length, and compactness might be reduced. In view of this, satisfying the conditional expression (1) is an essential condition in shortening the total optical length in the imaging lens.

The conditional expression (2) specified for this imaging lens concerns appropriate power allocations to the first lens and the third lens. An absolute value is used as the focal length of the third lens, because the third lens has negative power.

If the lower limit value defined by the conditional expression (2) is not reached, the power of the first lens becomes too strong. As a result, spherical aberration and off-axis coma aberration occurrences increase, and aberration correction becomes difficult.

If the upper limit value defined by the conditional expression (2) is exceeded, on the other hand, the power of the first lens becomes too weak to allow the first lens and the third lens to perform appropriate achromatizing. As a result, optical performance high enough for high-pixel imaging elements cannot be maintained. Also, in an imaging environment where a strong power source exists, color bleeding (flare) occurs, to adversely affect image quality.

Therefore, in the imaging lens, the conditional expression (2) is satisfied, so that the imaging lens is made even thinner than a conventional lens, and optical performance high enough for high-pixel imaging elements can be achieved.

Further, the conditional expression (3) specified for this imaging lens is a conditional expression that concerns appropriate power allocations to the first lens and the second lens.

If the lower limit value defined by this conditional expression (3) is not reached, the power of the second lens becomes too weak, and a large proportion of the load is put on the first lens. As a result, spherical aberration and off-axis coma aberration occurrences increase, and correcting the spherical aberration and the off-axis coma aberration becomes difficult. This also hinders achromatizing with the third lens, and therefore, optical performance high enough for high-pixel imaging elements cannot be maintained.

If the upper limit value defined by the conditional expression (3) is exceeded, on the other hand, the power of the second lens becomes too strong. As a result, sensitivity in manufacture becomes higher, and easiness of assembling is reduced at the time of manufacture.

Therefore, in the imaging lens, the conditional expression (3) is satisfied, so that optical performance high enough for high-pixel imaging elements can be achieved while the power allocations to the first lens and the second lens are optimized.

Further, in this imaging lens, it is preferable to satisfy the following conditional expression (4):

$$(\nu d_1 + \nu d_2)/2 - \nu d_3 > 20 \tag{4}$$

where
$\nu d_1$: the Abbe number of the first lens,
$\nu d_2$: the Abbe number of the second lens, and
$\nu d_3$: the Abbe number of the third lens.

This conditional expression (4) defines the Abbe numbers of the first through third lenses at a d-line single wavelength. Such a glass material that the Abbe number falls within the range defined by the conditional expression (4) is used for each of the first lens, the second lens, and the third lens in the imaging lens, so that excellent chromatic aberration correction can be performed without a large increase in the power of each lens.

If the lower limit value defined by the conditional expression (4) is not reached in the imaging lens, color bleeding (flare) occurs to adversely affect image quality. If the conditional expression (4) is satisfied, the power of each lens does not become very strong. Accordingly, coma aberration and field curvature occurrences can be restrained in the surrounding area, and furthermore, sensitivity in manufacture can be effectively restrained.

Therefore, in the imaging lens, the conditional expression (4) is satisfied, so that excellent chromatic aberration correction can be performed, and coma aberration and field curvature occurrences are restrained in the surrounding area to lower the sensitivity in manufacture.

Further, in the imaging lens, the relationship between the focal length of the entire lens system and the focal length of the fifth lens satisfies the following conditional expression (5):

$$0.5 < |f_5|/f < 1.8 \tag{5}$$

where
f: the focal length of the entire lens system, and
$f_5$: the focal length of the fifth lens.

The conditional expression (5) specified for this imaging lens is a conditional expression that concerns an appropriate power allocation to the fifth lens relative to the power of the entire lens system.

If the lower limit value defined by the conditional expression (5) is not reached, the power of the fifth lens becomes too strong. As a result, appropriate field correction (correction to achieve uniform resolving power from the axis to the surrounding area) becomes difficult. Also, optical sensitivity becomes higher, and easiness of assembling is reduced in manufacture.

If the upper limit value defined by the conditional expression (5) is exceeded, on the other hand, the power of the fifth lens becomes too weak, and appropriate aberration correction, particularly field correction (according to the Petzval's law), becomes difficult.

Therefore, in the imaging lens, the conditional expression (5) is satisfied, so that optical performance high enough for high-pixel imaging elements can be achieved while the power allocation to the fifth lens relative to the entire lens system is optimized.

In the imaging lens, the first lens has a convex surface facing the object side and has positive refractive power. Accordingly, an achromatizing effect can be achieved with the first lens, the second lens, and the third lens, while the refractive power is increased.

In the imaging lens, the third lens has a concave surface on the imaging plane side. Accordingly, even when an off-axis light beam is totally-reflected by the concave surface, the totally-reflected off-axis light beam diffuses to the lens peripheral portion and is prevented from directly entering a solid-state imaging element such as a CCD or CMOS. Thus, formation of ghosts can be prevented.

In the imaging lens, the third lens has the concave surface on the imaging plane side, to effectively correct field curvatures and coma aberrations. Further, in the imaging lens, the fourth lens has a meniscus shape with positive power, to effectively correct aberrations, particularly field curvatures and astigmatisms.

Further, in the imaging lens, the second lens has a convex surface facing the imaging plane side and has positive or negative refractive power. Accordingly, an achromatizing effect can be achieved with the second lens and the third lens.

Further, in the imaging lens, the fifth lens has negative power in the vicinity of the axis, and accordingly, is effective in correcting aberrations, particularly field curvatures. The fifth lens also has a convex surface at the peripheral portion, and accordingly, is effective in correcting astigmatisms and distortions.

In the imaging lens, the above described conditions are satisfied, so that contrast degradation due to ghosts and flares can be reduced, and optical performance high enough for high-pixel imaging elements can be achieved, while the imaging lens is made very small and thin.

2. Numerical Examples According to the Embodiment

Referring now to the drawings and tables, numerical examples applying specific numerical values to imaging lenses of the present invention are described. The meanings of the symbols to be used in the numerical examples are as follows.

"FNo" represents the F-number, "f" represents the focal length of the entire lens system, "2ω" represents the full field angle at an opposing corner, "Si" represents the plane number of the ith plane counted from the object side, "Ri" represents the curvature radius of the ith plane, "di" represents the on-axis plane interval between the ith plane and the (i+1) plane counted from the object side, "ni" represents the refractive index of the ith lens at the d-line (at a wavelength of 587.6 nm), and "vi" represents the Abbe number of the ith lens at the d-line (at the wavelength of 587.6 nm). It should be noted that "∞" with respect to a curvature radius indicates that the subject plane is a flat plane.

Some of the imaging lenses used in the respective numerical examples have aspheric lens surfaces. Where "Z" represents the depth of the aspheric surface, "Y" represents the height from the optical axis, "R" represents the curvature radius, "K" represents the conic constant, and "Ai" represents the aspheric coefficient of the ith (i being an integer of 3 or greater) order, an aspheric shape is defined by the following mathematical formula 1:

$$Z = \frac{\frac{Y^2}{R}}{1 + \sqrt{1 - (1+K)\left(\frac{Y}{R}\right)^2}} + \Sigma Ai \cdot Y^i \quad (1)$$

[2-1. First Numerical Example]

In FIG. 1, reference numeral 1 indicates an entire imaging lens in a first numerical example. A first lens G1 having positive refractive power, an aperture stop STO, a second lens G2 having positive or negative refractive power, a third lens G3 having negative refractive power, a fourth lens G4 having positive refractive power, and a fifth lens G5 having negative refractive power are provided in this order from the object side. Positive power is forward in the entire lens system.

In the imaging lens 1, sealing glass SG for protecting an imaging plane IMG is provided between the fifth lens G5 and the imaging plane IMG of an imaging element.

In this imaging lens 1, a first lens (not shown) having a four-lens structure is divided into two. While the two divisional lenses (the first lens G1 and the second lens G2) complement each other with power, the number of aberration correction planes is increased by two compared with that prior to the division.

With this arrangement in the imaging lens 1, the first lens G1 and the second lens G2 complement each other with power. Accordingly, a decrease in the curvature radius of the first lens G1 can be restrained, and an increase in the refractive power can also be restrained. Thus, spherical aberration correction can be performed. Also, coma aberration correction can be performed, even if the lens aperture is made larger and Fno is made smaller (brighter) to achieve higher image quality.

Although separated in the imaging lens 1, the first lens G1 and the second lens G2 are located very close to each other, so that chromatic aberrations that have occurred in the first lens G1 and the second lens G2 can be offset by the third lens G3.

In the imaging lens 1, the aperture stop STO is provided between the first lens G1 and the second lens G2 that are separated. Accordingly, distortions can be more efficiently corrected than in a case where the aperture stop STO is located closer to the object side than the first lens G1 is. This also contributes to a decrease in optical sensitivity, and assembling becomes easier in the manufacturing procedures.

Further, in the imaging lens 1, the first lens G1 has a convex surface facing the object side and has positive refractive power. Accordingly, an achromatizing effect can be achieved with the first lens G1, the second lens G2, and the third lens G3, while the refractive power is increased.

In the imaging lens 1, the third lens G3 has a concave surface on the imaging plane side. Accordingly, even when an off-axis light beam is totally-reflected by the concave surface, the totally-reflected off-axis light beam diffuses to the lens peripheral portion and is prevented from directly entering the imaging plane IMG of a solid-state imaging element such as a CCD or CMOS. Thus, formation of ghosts can be prevented.

In the imaging lens 1, the third lens G3 has the concave surface on the imaging plane side, to effectively correct field curvatures and coma aberrations. Further, in the imaging lens 1, the fourth lens G4 has a meniscus shape with positive power, to effectively correct aberrations, particularly field curvatures and astigmatisms.

Further, in the imaging lens 1, the second lens G2 has a convex surface facing the imaging plane side and has positive or negative refractive power. Accordingly, an achromatizing effect can be achieved with the second lens G2 and the third lens G3.

Further, in the imaging lens 1, the fifth lens G5 has negative power in the vicinity of the axis, and accordingly, is effective in correcting aberrations, particularly field curvatures. The fifth lens G5 also has a convex surface at the peripheral portion, and accordingly, is effective in correcting astigmatisms and distortions.

In the following, Table 1 shows the lens data obtained when specific numerical values were applied to the imaging lens 1 of the first numerical example according to the embodiment, in conjunction with an F-number FNo, a focal length f of the entire lens system, and a field angle 2ω. In Table 1, each curvature radius Ri of ∞ means that the plane is a flat plane.

TABLE 1

Lens Data in the First Numerical Example
FNo = 2.4 f = 3.8 2ω = 72.9°

| Si Plane number | Ri Curvature radius | Di Plane interval | Ndi Refractive index | vdi Abbe number |
|---|---|---|---|---|
| 1 | 2.958 | 0.442 | 1.531 | 55.9 |
| 2 | −15.403 | 0.040 | — | — |
| 3(STO) | ∞ | 0.059 | — | — |
| 4 | 11.972 | 0.483 | 1.531 | 55.9 |
| 5 | −5.476 | 0.040 | — | — |
| 6 | 9.229 | 0.300 | 1.615 | 25.6 |
| 7 | 1.985 | 0.645 | — | — |
| 8 | −2.987 | 0.745 | 1.531 | 55.9 |
| 9 | −1.114 | 0.040 | — | — |
| 10 | 1.795 | 0.550 | 1.531 | 55.9 |
| 11 | 0.840 | 0.806 | — | — |
| 12 | ∞ | 0.150 | 1.518 | 64.1 |
| 13 | ∞ | 0.700 | — | — |

Table 2 shows the third-order, fourth-order, fifth-order, sixth-order, seventh-order, eighth-order, ninth-order, tenth-order, eleventh-order, and twelfth-order aspheric coefficients of aspheric planes in the imaging lens 1 of the first numerical example, in conjunction with conic constants "K". In Table 2, "E-02" is an exponential expression using 10 as the base, or represents "$10^{-2}$". For example, "0.12345E-05" represents "$0.12345 \times 10^{-5}$".

correction can be performed. Also, coma aberration correction can be performed, even if the lens aperture is made larger and Fno is made smaller (brighter) to achieve higher image quality.

TABLE 2

Aspheric Plane Data in the First Numerical Example
FNo = 2.4 f = 3.8 2ω = 72.9°

| Si Plane number | K Conic constant | Third-order | Fourth-order | Fifth-order | Sixth-order | Seventh-order |
|---|---|---|---|---|---|---|
| 1 | −1.06E+01 | — | 2.23E−02 | — | −4.59E−02 | — |
| 2 | −1.00E+01 | — | −5.51E−02 | — | 1.20E−01 | — |
| 3 (STO) | — | — | — | — | — | — |
| 4 | 1.00E+01 | — | −6.04E−02 | — | 5.97E−02 | — |
| 5 | 9.30E+00 | — | −1.94E−01 | — | 1.36E−01 | — |
| 6 | 1.95E−01 | — | −1.90E−01 | — | 7.74E−02 | — |
| 7 | 1.35E+00 | 2.22E−02 | −8.66E−02 | −2.16E−02 | −7.68E−03 | 8.30E−03 |
| 8 | 1.42E+00 | 2.66E−02 | 1.27E−01 | −8.08E−02 | 1.27E−02 | −4.98E−05 |
| 9 | −5.54E+00 | −1.17E−01 | 2.88E−02 | 8.08E−02 | −8.89E−02 | 4.21E−02 |
| 10 | −4.21E+00 | −1.24E−01 | 1.25E−01 | 1.71E−02 | −4.10E−02 | 2.45E−02 |
| 11 | −4.82E+00 | 1.14E−02 | −9.49E−02 | 4.07E−02 | −3.21E−03 | −1.11E−04 |

| Si Plane number | Eighth-order | Ninth-order | Tenth-order | Eleventh-order | Twelfth-order |
|---|---|---|---|---|---|
| 1 | 6.59E−02 | — | −3.91E−02 | — | — |
| 2 | −1.00E−01 | — | 8.49E−03 | — | — |
| 3 (STO) | — | — | — | — | — |
| 4 | −6.82E−02 | — | −8.21E−02 | — | — |
| 5 | −9.18E−02 | — | −4.63E−03 | — | — |
| 6 | 1.03E−01 | — | −5.83E−02 | — | — |
| 7 | 5.30E−02 | 2.11E−02 | −4.57E−02 | — | — |
| 8 | 4.76E−03 | 1.58E−02 | −3.09E−02 | 1.88E−02 | −4.10E−03 |
| 9 | −1.06E−02 | 6.03E−03 | 4.16E−03 | −2.44E−03 | −8.07E−04 |
| 10 | 4.13E−03 | −5.72E−03 | 1.02E−03 | — | — |
| 11 | −6.98E−04 | −1.82E−04 | 1.41E−04 | — | — |

Figure 2:
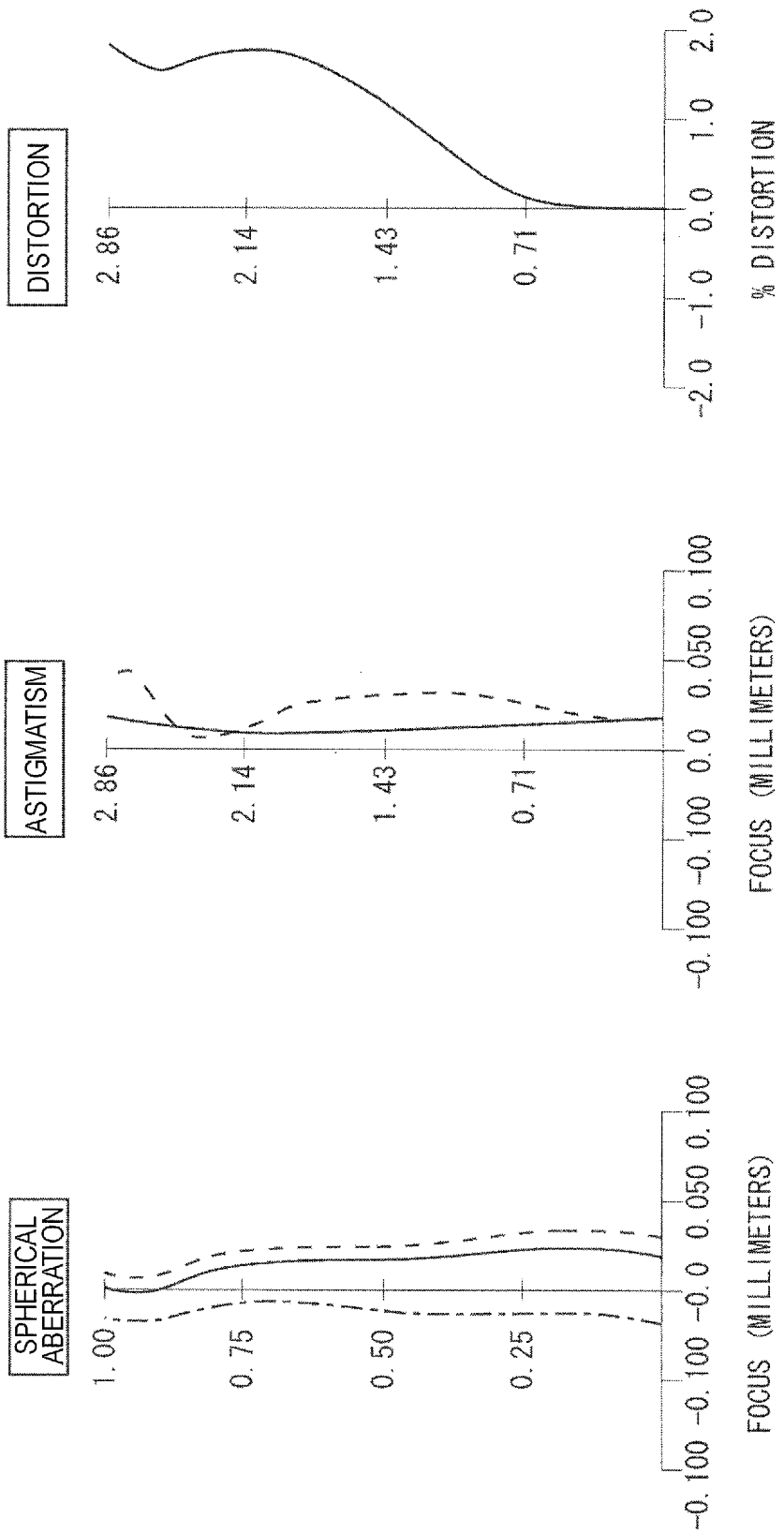
FIG. 2 shows characteristic curves indicating the aberrations in the first numerical example.

FIG. 2 shows aberrations in the imaging lens 1 of the first numerical example. In the astigmatism graph, the solid line indicates values in a sagittal imaging plane, and the dashed line indicates values in a meridional imaging plane.

As can be seen from the aberration graphs (a spherical aberration graph, an astigmatism graph, and a distortion graph) in FIG. 2, aberrations are appropriately corrected, and excellent imaging performance is achieved by the imaging lens 1 of the first numerical example.

[2-2. Second Numerical Example]

Figure 3:
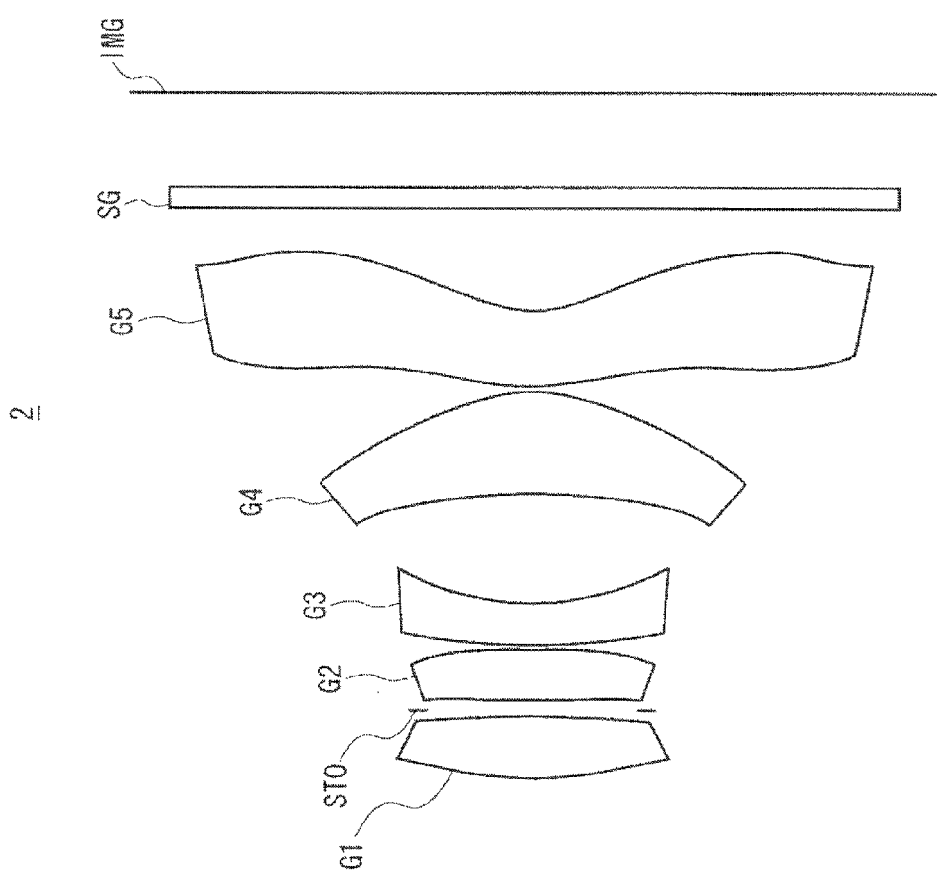
FIG. 3 is a schematic cross-sectional diagram showing the structure of an imaging lens in a second numerical example.

In FIG. 3, reference numeral 2 indicates an entire imaging lens in a second numerical example. A first lens G1 having positive refractive power, an aperture stop STO, a second lens G2 having positive or negative refractive power, a third lens G3 having negative refractive power, a fourth lens G4 having positive refractive power, and a fifth lens G5 having negative refractive power are provided in this order from the object side. Positive power is forward in the entire lens system.

In the imaging lens 2, sealing glass SG for protecting an imaging plane IMG is provided between the fifth lens G5 and the imaging plane IMG of an imaging element.

In this imaging lens 2, a first lens (not shown) having a four-lens structure is divided into two. While the two divisional lenses (the first lens G1 and the second lens G2) complement each other with power, the number of aberration correction planes is increased by two compared with that prior to the division.

With this arrangement in the imaging lens 2, the first lens G1 and the second lens G2 complement each other with power. Accordingly, a decrease in the curvature radius of the first lens G1 can be restrained, and an increase in the refractive power can also be restrained. Thus, spherical aberration Although separated in the imaging lens 2, the first lens G1 and the second lens G2 are located very close to each other, so that chromatic aberrations that have occurred in the first lens G1 and the second lens G2 can be offset by the third lens G3.

In the imaging lens 2, the aperture stop STO is provided between the first lens G1 and the second lens G2 that are separated. Accordingly, distortions can be more efficiently corrected than in a case where the aperture stop STO is located closer to the object side than the first lens G1 is. This also contributes to a decrease in optical sensitivity, and assembling becomes easier in the manufacturing procedures.

Further, in the imaging lens 2, the first lens G1 has a convex surface facing the object side and has positive refractive power. Accordingly, an achromatizing effect can be achieved with the first lens G1, the second lens G2, and the third lens G3, while the refractive power is increased.

In the imaging lens 2, the third lens G3 has a concave surface on the imaging plane side. Accordingly, even when an off-axis light beam is totally-reflected by the concave surface, the totally-reflected off-axis light beam diffuses to the lens peripheral portion and is prevented from directly entering the imaging plane IMG of a solid-state imaging element such as a CCD or CMOS. Thus, formation of ghosts can be prevented.

In the imaging lens 2, the third lens G3 has the concave surface on the imaging plane side, to effectively correct field curvatures and coma aberrations. Further, in the imaging lens 2, the fourth lens G4 has a meniscus shape with positive power, to effectively correct aberrations, particularly field curvatures and astigmatisms.

Further, in the imaging lens 2, the second lens G2 has a convex surface facing the imaging plane side and has positive or negative refractive power. Accordingly, an achromatizing effect can be achieved with the second lens G2 and the third lens G3.

Further, in the imaging lens 2, the fifth lens G5 has negative power in the vicinity of the axis, and accordingly, is effective in correcting aberrations, particularly field curvatures. The fifth lens G5 also has a convex surface at the peripheral portion, and accordingly, is effective in correcting astigmatisms and distortions.

In the following, Table 3 shows the lens data obtained when specific numerical values were applied to the imaging lens 2 of the second numerical example according to the embodiment, in conjunction with an F-number FNo, a focal length f of the entire lens system, and a field angle 2ω. In Table 3, each curvature radius Ri of ∞ means that the plane is a flat plane.

Table 4 shows the third-order, fourth-order, fifth-order, sixth-order, seventh-order, eighth-order, ninth-order, tenth-order, eleventh-order, and twelfth-order aspheric coefficients of aspheric planes in the imaging lens 2 of the second numerical example, in conjunction with conic constants "K". In Table 4, "E-02" is an exponential expression using 10 as the base, or represents "$10^{-2}$". For example, "0.12345E-05" represents "$0.12345 \times 10^{-5}$".

TABLE 4

Aspheric Plane Data in the Second Numerical Example
FNo = 2.4 f = 3.9 2ω = 71.8°

| Si Plane number | K Conic constant | Third-order | Fourth-order | Fifth-order | Sixth-order | Seventh-order |
|---|---|---|---|---|---|---|
| 1 | −1.06E+01 | — | 2.23E−02 | — | −4.93E−02 | — |
| 2 | −1.41E+01 | — | −5.28E−02 | — | 1.12E−01 | — |
| 3 (STO) | — | — | — | — | — | — |
| 4 | 1.00E+01 | — | −5.89E−02 | — | 5.57E−02 | — |
| 5 | 9.30E+00 | — | −1.79E−01 | — | 1.27E−01 | — |
| 6 | 1.95E−01 | — | −1.14E−01 | — | 5.90E−02 | — |
| 7 | 1.35E+00 | 2.16E−02 | −5.18E−02 | −8.36E−03 | −2.09E−02 | 6.08E−06 |
| 8 | 1.42E+00 | 2.33E−02 | 1.20E−01 | −8.69E−02 | −4.13E−03 | −2.20E−03 |
| 9 | −7.32E+00 | −1.21E−01 | 3.52E−02 | 8.48E−02 | −9.07E−02 | 3.84E−02 |
| 10 | −4.21E+00 | −1.19E−01 | 7.23E−03 | 2.05E−02 | −4.12E−02 | 2.39E−02 |
| 11 | −4.82E+00 | 2.50E−02 | −9.48E−02 | 3.09E−02 | 2.16E−03 | −5.17E−04 |

| Si Plane number | Eighth-order | Ninth-order | Tenth-order | Eleventh-order | Twelfth-order |
|---|---|---|---|---|---|
| 1 | 6.80E−02 | — | −3.88E−02 | — | — |
| 2 | −9.46E−02 | — | 8.39E−03 | — | — |
| 3 (STO) | — | — | — | — | — |
| 4 | −3.72E−02 | — | −1.13E−01 | — | — |
| 5 | −1.14E−01 | — | −3.05E−03 | — | — |
| 6 | 5.16E−02 | — | −2.74E−02 | — | — |
| 7 | 5.02E−02 | 3.28E−02 | −4.10E−02 | — | — |
| 8 | 8.25E−03 | 1.78E−02 | −3.03E−02 | 1.79E−02 | −6.38E−03 |
| 9 | −1.39E−02 | 3.93E−03 | 3.64E−03 | −2.27E−03 | −1.61E−04 |
| 10 | 4.01E−03 | −5.66E−03 | 1.03E−03 | — | — |
| 11 | −7.71E−04 | −2.43E−04 | 1.50E−04 | — | — |

Figure 4:
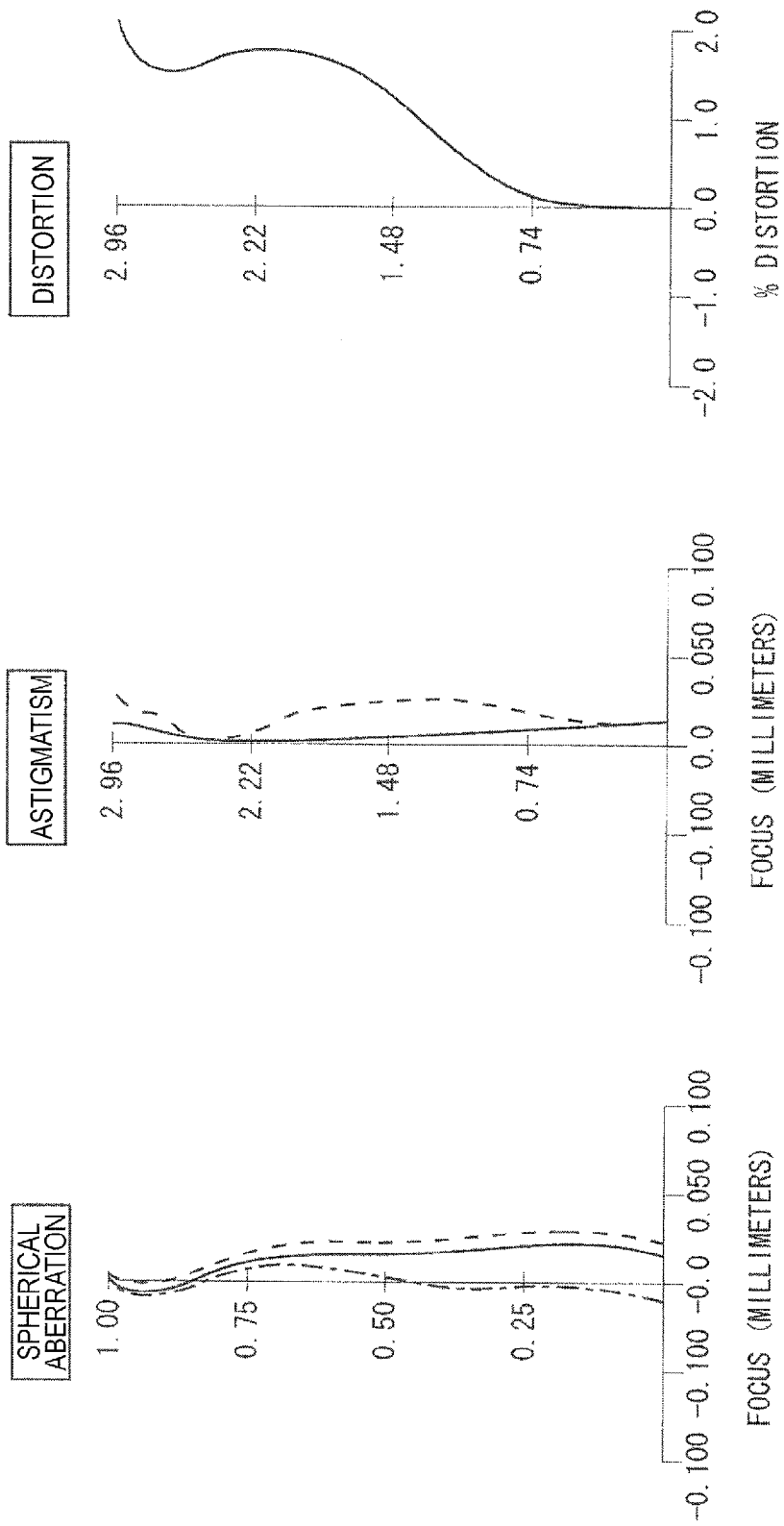
FIG. 4 shows characteristic curves indicating the aberrations in the second numerical example.

FIG. 4 shows aberrations in the imaging lens 2 of the second numerical example. In the astigmatism graph, the solid line indicates values in a sagittal imaging plane, and the dashed line indicates values in a meridional imaging plane.

As can be seen from the aberration graphs (a spherical aberration graph, an astigmatism graph, and a distortion graph) in FIG. 4, aberrations are appropriately corrected, and excellent imaging performance is achieved by the imaging lens 2 of the second numerical example.

[2-3. Third Numerical Example]

Figure 5:
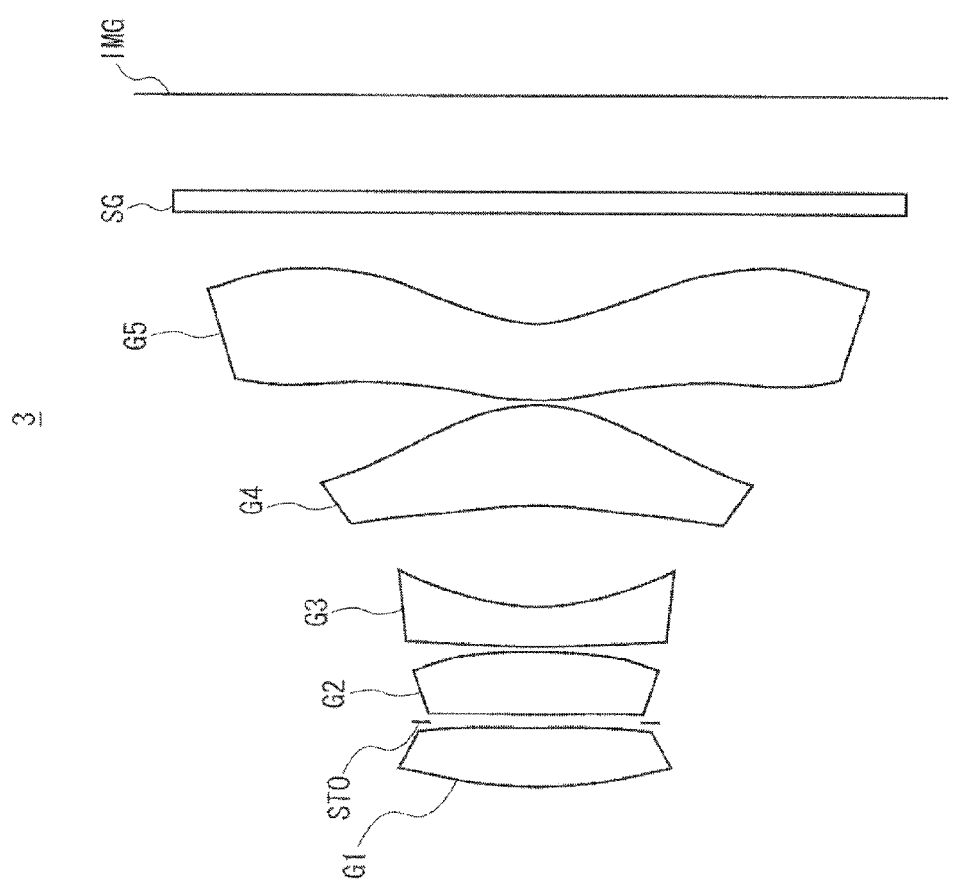
FIG. 5 is a schematic cross-sectional diagram showing the structure of an imaging lens in a third numerical example.

In FIG. 5, reference numeral 3 indicates an entire imaging lens in a third numerical example. A first lens G1 having positive refractive power, an aperture stop STO, a second lens G2 having positive or negative refractive power, a third lens G3 having negative refractive power, a fourth lens G4 having positive refractive power, and a fifth lens G5 having negative refractive power are provided in this order from the object side. Positive power is forward in the entire lens system.

In the imaging lens 3, sealing glass SG for protecting an imaging plane IMG is provided between the fifth lens G5 and the imaging plane IMG of an imaging element.

In this imaging lens 3, a first lens (not shown) having a four-lens structure is divided into two. While the two divisional lenses (the first lens G1 and the second lens G2) complement each other with power, the number of aberration correction planes is increased by two compared with that prior to the division.

TABLE 3

Lens Data in the Second Numerical Example
FNo = 2.4 f = 3.9 2ω = 71.8°

| Si Plane number | Ri Curvature radius | Di Plane interval | Ndi Refractive index | vdi Abbe number |
|---|---|---|---|---|
| 1 | 2.922 | 0.447 | 1.533 | 71.6 |
| 2 | −14.124 | 0.040 | — | — |
| 3(STO) | ∞ | 0.082 | — | — |
| 4 | 11.544 | 0.368 | 1.533 | 71.6 |
| 5 | −47.848 | 0.040 | — | — |
| 6 | 3.938 | 0.300 | 1.615 | 25.6 |
| 7 | 2.091 | 0.796 | — | — |
| 8 | −3.351 | 0.739 | 1.535 | 56.3 |
| 9 | −1.275 | 0.040 | — | — |
| 10 | 1.711 | 0.556 | 1.535 | 56.3 |
| 11 | 0.854 | 0.743 | — | — |
| 12 | ∞ | 0.150 | 1.518 | 64.1 |
| 13 | ∞ | 0.700 | — | — |

With this arrangement in the imaging lens 3, the first lens G1 and the second lens G2 complement each other with power. Accordingly, a decrease in the curvature radius of the first lens G1 can be restrained, and an increase in the refractive power can also be restrained. Thus, spherical aberration correction can be performed. Also, coma aberration correction can be performed, even if the lens aperture is made larger and Fno is made smaller (brighter) to achieve higher image quality.

Although separated in the imaging lens 3, the first lens G1 and the second lens G2 are located very close to each other, so that chromatic aberrations that have occurred in the first lens G1 and the second lens G2 can be offset by the third lens G3.

In the imaging lens 3, the aperture stop STO is provided between the first lens G1 and the second lens G2 that are separated. Accordingly, distortions can be more efficiently corrected than in a case where the aperture stop STO is located closer to the object side than the first lens G1 is. This also contributes to a decrease in optical sensitivity, and assembling becomes easier in the manufacturing procedures.

Further, in the imaging lens 3, the first lens G1 has a convex surface facing the object side and has positive refractive power. Accordingly, an achromatizing effect can be achieved with the first lens G1, the second lens G2, and the third lens G3, while the refractive power is increased.

In the imaging lens 3, the third lens G3 has a concave surface on the imaging plane side. Accordingly, even when an off-axis light beam is totally-reflected by the concave surface, the totally-reflected off-axis light beam diffuses to the lens peripheral portion and is prevented from directly entering the imaging plane IMG of a solid-state imaging element such as a CCD or CMOS. Thus, formation of ghosts can be prevented.

In the imaging lens 3, the third lens G3 has the concave surface on the imaging plane side, to effectively correct field curvatures and coma aberrations. Further, in the imaging lens 3, the fourth lens G4 has a meniscus shape with positive power, to effectively correct aberrations, particularly field curvatures and astigmatisms.

Further, in the imaging lens 3, the second lens G2 has a convex surface facing the imaging plane side and has positive or negative refractive power. Accordingly, an achromatizing effect can be achieved with the second lens G2 and the third lens G3.

Further, in the imaging lens 3, the fifth lens G5 has negative power in the vicinity of the axis, and accordingly, is effective in correcting aberrations, particularly field curvatures. The fifth lens G5 also has a convex surface at the peripheral portion, and accordingly, is effective in correcting astigmatisms and distortions.

In the following, Table 5 shows the lens data obtained when specific numerical values were applied to the imaging lens 3 of the third numerical example according to the embodiment, in conjunction with an F-number FNo, a focal length f of the entire lens system, and a field angle 2ω. In Table 5, each curvature radius Ri of ∞ means that the plane is a flat plane.

TABLE 5

Lens Data in the Third Numerical Example
FNo = 2.4 f = 3.8 2ω = 72.6°

| Si Plane number | Ri Curvature radius | Di Plane interval | Ndi Refractive index | vdi Abbe number |
|---|---|---|---|---|
| 1 | 2.900 | 0.436 | 1.535 | 56.3 |
| 2 | −15.623 | 0.040 | — | — |
| 3(STO) | ∞ | 0.053 | — | — |
| 4 | 14.293 | 0.448 | 1.535 | 56.3 |
| 5 | −10.494 | 0.040 | — | — |
| 6 | 4.233 | 0.300 | 1.615 | 25.6 |
| 7 | 1.916 | 0.720 | — | — |
| 8 | −3.106 | 0.725 | 1.535 | 56.3 |
| 31 1.127 | 0.040 | — | — | |
| 10 | 1.829 | 0.551 | 1.535 | 56.3 |
| 11 | 0.841 | 0.798 | — | — |
| 12 | ∞ | 0.150 | 1.518 | 64.1 |
| 13 | ∞ | 0.700 | — | — |

Table 6 shows the third-order, fourth-order, fifth-order, sixth-order, seventh-order, eighth-order, ninth-order, tenth-order, eleventh-order, and twelfth-order aspheric coefficients of aspheric planes in the imaging lens 3 of the third numerical example, in conjunction with conic constants "K". In Table 6, "E-02" is an exponential expression using 10 as the base, or represents "$10^{-2}$". For example, "0.12345E-05" represents "$0.12345 \times 10^{-5}$".

TABLE 6

Aspheric Plane Data in the Third Numerical Example
FNo = 2.4 f = 3.8 2ω = 72.6°

| Si Plane number | K Conic constant | Third-order | Fourth-order | Fifth-order | Sixth-order | Seventh-order |
|---|---|---|---|---|---|---|
| 1 | −1.06E+01 | — | 1.89E−02 | — | −4.43E−02 | — |
| 2 | −1.56E+01 | — | −5.74E−02 | — | 1.16E−01 | — |
| 3 (STO) | — | — | — | — | — | — |
| 4 | 1.00E+01 | — | −5.66E−02 | — | 6.18E−02 | — |
| 5 | −1.05E+01 | — | −2.00E−01 | — | 1.32E−01 | — |
| 6 | 1.95E−01 | — | −1.84E−01 | — | 6.76E−02 | — |
| 7 | 1.35E+00 | 2.01E−02 | −9.21E−02 | −2.63E−02 | −1.05E−02 | 9.52E−03 |
| 8 | 1.42E+00 | 2.18E−02 | 1.22E−01 | −8.05E−02 | 1.18E−02 | −1.05E−03 |
| 9 | −5.64E+00 | −1.15E−01 | 3.31E−02 | 7.75E−02 | −9.10E−02 | 4.21E−02 |
| 10 | −4.21E+00 | −1.21E−01 | 1.12E−02 | 1.63E−02 | −4.09E−02 | 2.45E−02 |
| 11 | −4.82E+00 | 1.06E−02 | −9.14E−02 | 3.91E−02 | −3.32E−03 | −6.05E−05 |

| Si Plane number | Eighth-order | Ninth-order | Tenth-order | Eleventh-order | Twelfth-order |
|---|---|---|---|---|---|
| 1 | 6.52E−02 | — | −3.79E−•• | — | — |
| 2 | −8.83E−02 | — | 1.26E−•• | — | — |

TABLE 6-continued

Aspheric Plane Data in the Third Numerical Example
FNo = 2.4 f = 3.8 2ω = 72.6°

| | | | | | |
|---|---|---|---|---|---|
| 3 (STO) | — | — | — | — | — |
| 4 | −6.63E−02 | — | −7.36E−•• | — | — |
| 5 | −9.36E−02 | — | 5.74E−•• | — | — |
| 6 | 9.53E−02 | — | −4.76E−•• | — | — |
| 7 | 5.34E−02 | 2.45E−02 | −4.74E−•• | — | — |
| 8 | 5.12E−03 | 1.67E−02 | −3.03E−•• | 1.89E−02 | −4.72E−03 |
| 9 | −1.02E−02 | 6.17E−03 | 4.23E−•• | −2.48E−03 | −8.02E−04 |
| 10 | 4.16E−03 | −5.71E−03 | 1.01E−•• | — | — |
| 11 | −6.09E−04 | −1.94E−04 | 1.33E−•• | — | — |

Figure 6:
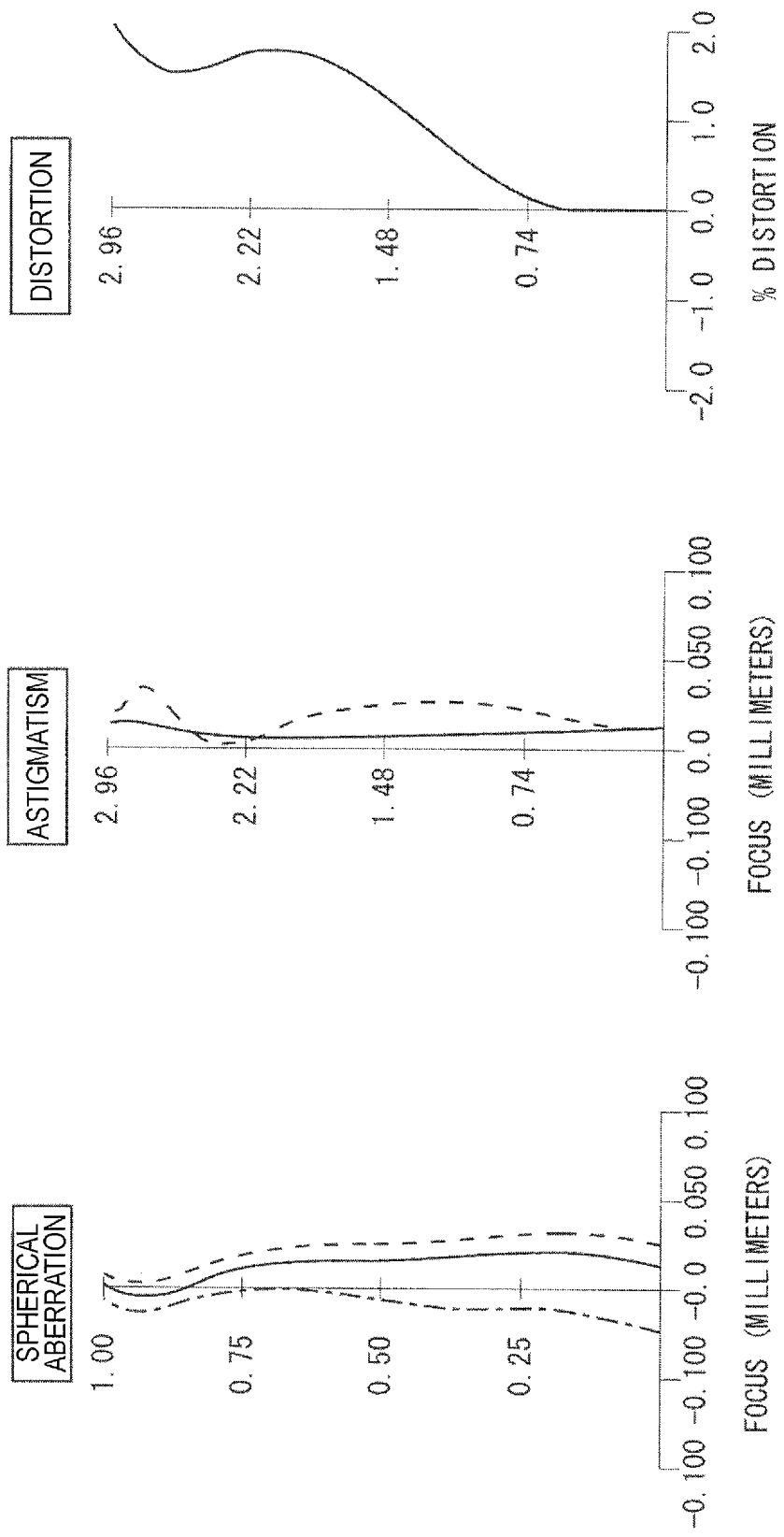
FIG. 6 shows characteristic curves indicating the aberrations in the third numerical example.

FIG. 6 shows aberrations in the imaging lens 3 of the third numerical example. In the astigmatism graph, the solid line indicates values in a sagittal imaging plane, and the dashed line indicates values in a meridional imaging plane.

As can be seen from the aberration graphs (a spherical aberration graph, an astigmatism graph, and a distortion graph) in FIG. 6, aberrations are appropriately corrected, and excellent imaging performance is achieved by the imaging lens 3 of the third numerical example.

[2-4. Fourth Numerical Example]

Figure 7:
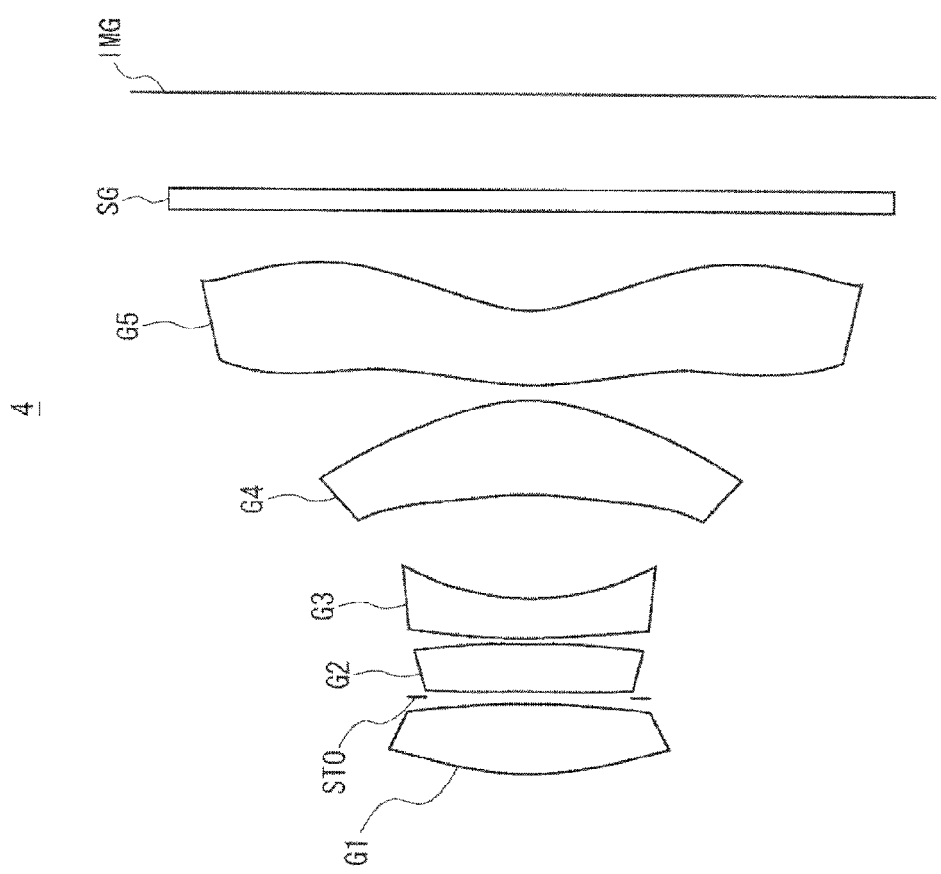
FIG. 7 is a schematic cross-sectional diagram showing the structure of an imaging lens in a fourth numerical example.

In FIG. 7, reference numeral 4 indicates an entire imaging lens in a fourth numerical example. A first lens G1 having positive refractive power, an aperture stop STO, a second lens G2 having positive or negative refractive power, a third lens G3 having negative refractive power, a fourth lens G4 having positive refractive power, and a fifth lens G5 having negative refractive power are provided in this order from the object side. Positive power is forward in the entire lens system.

In the imaging lens 4, sealing glass SG for protecting an imaging plane IMG is provided between the fifth lens G5 and the imaging plane IMG of an imaging element.

In this imaging lens 4, a first lens (not shown) having a four-lens structure is divided into two. While the two divisional lenses (the first lens G1 and the second lens G2) complement each other with power, the number of aberration correction planes is increased by two compared with that prior to the division.

With this arrangement in the imaging lens 4, the first lens G1 and the second lens G2 complement each other with power. Accordingly, a decrease in the curvature radius of the first lens G1 can be restrained, and an increase in the refractive power can also be restrained. Thus, spherical aberration correction can be performed. Also, coma aberration correction can be performed, even if the lens aperture is made larger and Fno is made smaller (brighter) to achieve higher image quality.

Although separated in the imaging lens 4, the first lens G1 and the second lens G2 are located very close to each other, so that chromatic aberrations that have occurred in the first lens G1 and the second lens G2 can be offset by the third lens G3.

In the imaging lens 4, the aperture stop STO is provided between the first lens G1 and the second lens G2 that are separated. Accordingly, distortions can be more efficiently corrected than in a case where the aperture stop STO is located closer to the object side than the first lens G1 is. This also contributes to a decrease in optical sensitivity, and assembling becomes easier in the manufacturing procedures.

Further, in the imaging lens 4, the first lens G1 has a convex surface facing the object side and has positive refractive power. Accordingly, an achromatizing effect can be achieved with the first lens G1, the second lens G2, and the third lens G3, while the refractive power is increased.

In the imaging lens 4, the third lens G3 has a concave surface on the imaging plane side. Accordingly, even when an off-axis light beam is totally-reflected by the concave surface, the totally-reflected off-axis light beam diffuses to the lens peripheral portion and is prevented from directly entering the imaging plane IMG of a solid-state imaging element such as a CCD or CMOS. Thus, formation of ghosts can be prevented.

In the imaging lens 4, the third lens G3 has the concave surface on the imaging plane side, to effectively correct field curvatures and coma aberrations. Further, in the imaging lens 4, the fourth lens G4 has a meniscus shape with positive power, to effectively correct aberrations, particularly field curvatures and astigmatisms.

Further, in the imaging lens 4, the second lens G2 has a convex surface facing the imaging plane side and has positive or negative refractive power. Accordingly, an achromatizing effect can be achieved with the second lens G2 and the third lens G3.

Further, in the imaging lens 4, the fifth lens G5 has negative power in the vicinity of the axis, and accordingly, is effective in correcting aberrations, particularly field curvatures. The fifth lens G5 also has a convex surface at the peripheral portion, and accordingly, is effective in correcting astigmatisms and distortions.

In the following, Table 7 shows the lens data obtained when specific numerical values were applied to the imaging lens 4 of the fourth numerical example according to the embodiment, in conjunction with an F-number FNo, a focal length f of the entire lens system, and a field angle 2ω. In Table 7, each curvature radius Ri of ∞ means that the plane is a flat plane.

TABLE 7

Lens Data in the Fourth Numerical Example
FNo = 2.4 f = 4.1 2ω = 69.2°

| Si Plane number | Ri Curvature radius | Di Plane interval | Ndi Refractive index | νdi Abbe number |
|---|---|---|---|---|
| 1 | 2.442 | 0.517 | 1.535 | 56.3 |
| 2 | −7.985 | 0.040 | — | — |
| 3(STO) | ∞ | 0.050 | — | — |
| 4 | 36.736 | 0.350 | 1.535 | 56.3 |
| 5 | 47.420 | 0.040 | — | — |
| 6 | 4.213 | 0.300 | 1.615 | 25.6 |
| 7 | 2.003 | 0.759 | — | — |
| 8 | −3.547 | 0.696 | 1.535 | 56.3 |
| 9 | −1.476 | 0.111 | — | — |
| 10 | 1.797 | 0.550 | 1.535 | 56.3 |
| 11 | 0.976 | 0.738 | — | — |
| 12 | ∞ | 0.150 | 1.518 | 64.1 |
| 13 | ∞ | 0.700 | — | — |

Table 8 shows the third-order, fourth-order, fifth-order, sixth-order, seventh-order, eighth-order, ninth-order, tenth-order, eleventh-order, and twelfth-order aspheric coefficients of aspheric planes in the imaging lens 4 of the fourth numerical example, in conjunction with conic constants "K". In Table 8, "E-02" is an exponential expression using 10 as the base, or represents "$10^{-2}$". For example, "0.12345E-05" represents "$0.12345 \times 10^{-5}$".

TABLE 8

Aspheric Plane Data in the Fourth Numerical Example
FNo = 2.4 f = 4.1 2ω = 69.2°

| Si Plane number | K Conic constant | Third-order | Fourth-order | Fifth-order | Sixth-order | Seventh-order |
|---|---|---|---|---|---|---|
| 1 | −1.06E+01 | — | 6.13E−02 | — | −8.07E−02 | — |
| 2 | −1.00E+01 | — | −3.80E−02 | — | 9.57E−02 | — |
| 3 (STO) | — | — | — | — | — | — |
| 4 | 1.00E+01 | — | −2.37E−02 | — | 6.15E−02 | — |
| 5 | 9.30E+00 | — | −1.90E−01 | — | 1.67E−01 | — |
| 6 | 1.95E−01 | — | −1.56E−01 | — | 8.37E−02 | — |
| 7 | 1.35E+00 | 2.78E−02 | −7.89E−02 | −8.99E−03 | −8.35E−04 | 1.42E−02 |
| 8 | 1.42E+00 | 1.59E−02 | 1.24E−01 | −9.15E−02 | 2.91E−03 | −3.96E−03 |
| 9 | −8.07E+00 | −1.33E−01 | 5.98E−02 | 7.90E−02 | −9.71E−02 | 3.74E−02 |
| 10 | −4.21E+00 | −1.44E−01 | 2.02E−02 | 1.97E−02 | −4.11E−02 | 2.40E−02 |
| 11 | −4.82E+00 | −5.53E−03 | −8.35E−02 | 3.74E−02 | −2.01E−03 | −4.23E−04 |

| Si Plane number | Eighth-order | Ninth-order | Tenth-order | Eleventh-order | Twelfth-order |
|---|---|---|---|---|---|
| 1 | 6.18E−02 | — | −3.32E−02 | — | — |
| 2 | −1.31E−01 | — | 4.50E−02 | — | — |
| 3 (STO) | — | — | — | — | — |
| 4 | −9.03E−02 | — | −5.12E−03 | — | — |
| 5 | −9.84E−02 | — | 7.36E−03 | — | — |
| 6 | 1.14E−01 | — | −8.38E−02 | — | — |
| 7 | 5.12E−02 | 2.66E−02 | −5.55E−02 | — | — |
| 8 | 5.80E−03 | 1.78E−02 | −2.99E−02 | 1.85E−02 | −5.71E−03 |
| 9 | −1.23E−02 | 5.49E−03 | 4.13E−03 | −2.27E−03 | −5.54E−04 |
| 10 | 3.94E−03 | −5.74E−03 | 1.06E−03 | — | — |
| 11 | −7.93E−04 | −1.85E−04 | 1.59E−04 | — | — |

Figure 8:
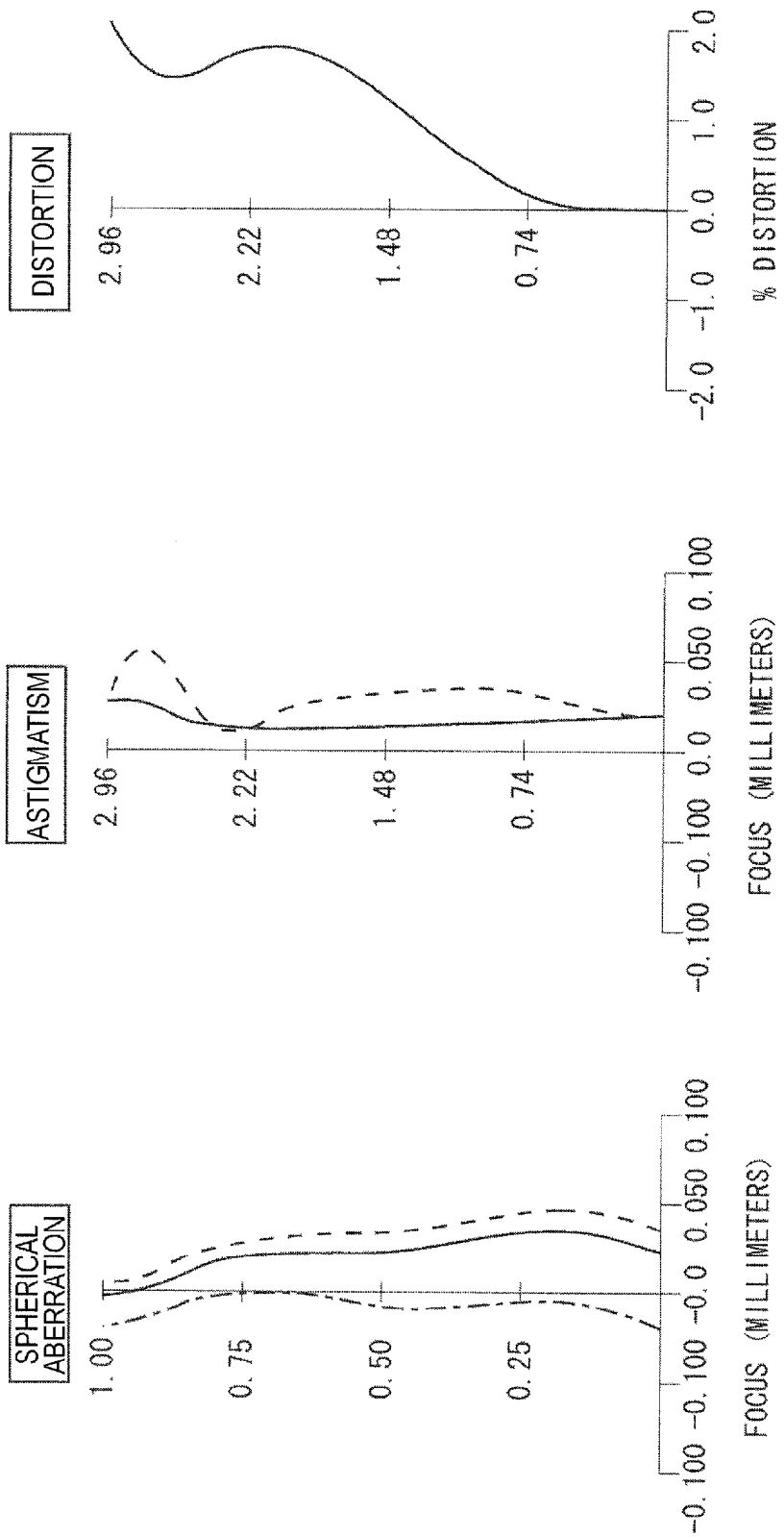
FIG. 8 shows characteristic curves indicating the aberrations in the fourth numerical example.

FIG. 8 shows aberrations in the imaging lens 4 of the fourth numerical example. In the astigmatism graph, the solid line indicates values in a sagittal imaging plane, and the dashed line indicates values in a meridional imaging plane.

As can be seen from the aberration graphs (a spherical aberration graph, an astigmatism graph, and a distortion graph) in FIG. 8, aberrations are appropriately corrected, and excellent imaging performance is achieved by the imaging lens 4 of the fourth numerical example.

[2-5. Fifth Numerical Example]

Figure 9:
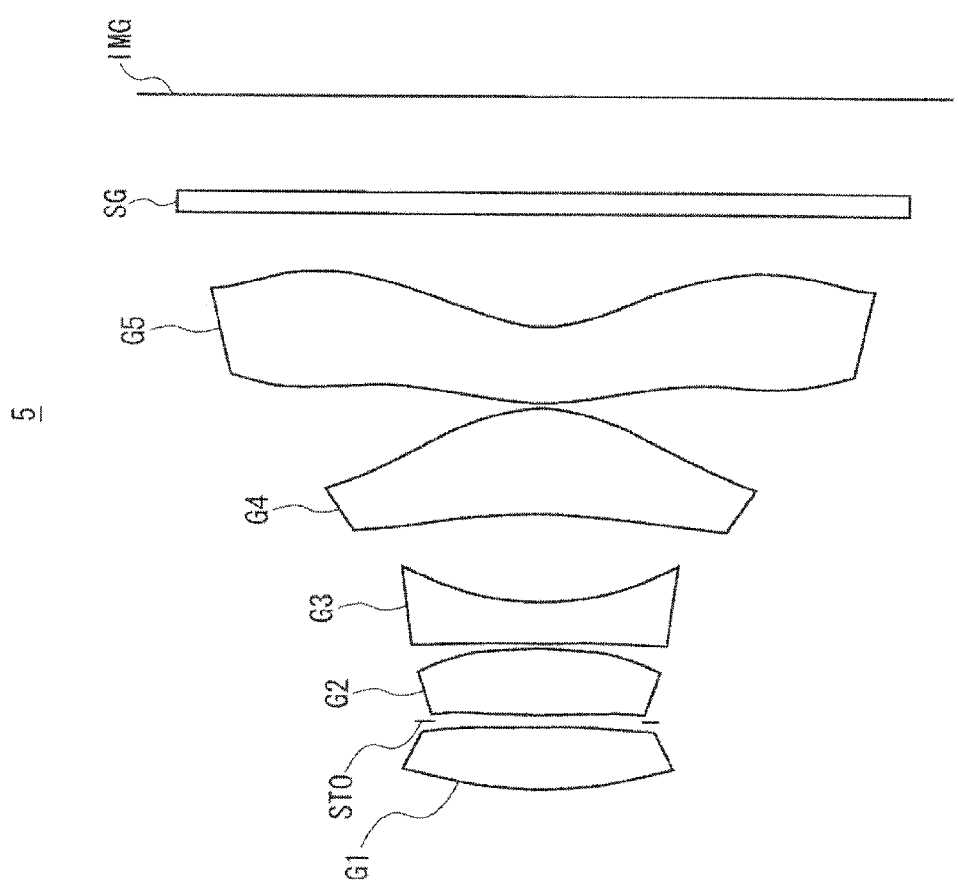
FIG. 9 is a schematic cross-sectional diagram showing the structure of an imaging lens in a fifth numerical example.

In FIG. 9, reference numeral 5 indicates an entire imaging lens in a fifth numerical example. A first lens G1 having positive refractive power, an aperture stop STO, a second lens G2 having positive or negative refractive power, a third lens G3 having negative refractive power, a fourth lens G4 having positive refractive power, and a fifth lens G5 having negative refractive power are provided in this order from the object side. Positive power is forward in the entire lens system.

In the imaging lens 5, sealing glass SG for protecting an imaging plane IMG is provided between the fifth lens G5 and the imaging plane IMG of an imaging element.

In this imaging lens 5, a first lens (not shown) having a four-lens structure is divided into two. While the two divisional lenses (the first lens G1 and the second lens G2) complement each other with power, the number of aberration correction planes is increased by two compared with that prior to the division.

With this arrangement in the imaging lens 5, the first lens G1 and the second lens G2 complement each other with power. Accordingly, a decrease in the curvature radius of the first lens G1 can be restrained, and an increase in the refractive power can also be restrained. Thus, spherical aberration correction can be performed. Also, coma aberration correction can be performed, even if the lens aperture is made larger and Fno is made smaller (brighter) to achieve higher image quality.

Although separated in the imaging lens 5, the first lens G1 and the second lens G2 are located very close to each other, so that chromatic aberrations that have occurred in the first lens G1 and the second lens G2 can be offset by the third lens G3.

In the imaging lens 5, the aperture stop STO is provided between the first lens G1 and the second lens G2 that are separated. Accordingly, distortions can be more efficiently corrected than in a case where the aperture stop STO is located closer to the object side than the first lens G1 is. This also contributes to a decrease in optical sensitivity, and assembling becomes easier in the manufacturing procedures.

Further, in the imaging lens 5, the first lens G1 has a convex surface facing the object side and has positive refractive power. Accordingly, an achromatizing effect can be achieved with the first lens G1, the second lens G2, and the third lens G3, while the refractive power is increased.

In the imaging lens 5, the third lens G3 has a concave surface on the imaging plane side. Accordingly, even when an off-axis light beam is totally-reflected by the concave surface, the totally-reflected off-axis light beam diffuses to the lens peripheral portion and is prevented from directly entering the imaging plane IMG of a solid-state imaging element such as a CCD or CMOS. Thus, formation of ghosts can be prevented.

In the imaging lens 5, the third lens G3 has the concave surface on the imaging plane side, to effectively correct field curvatures and coma aberrations. Further, in the imaging lens 5, the fourth lens G4 has a meniscus shape with positive power, to effectively correct aberrations, particularly field curvatures and astigmatisms.

Further, in the imaging lens 5, the second lens G2 has a convex surface facing the imaging plane side and has positive or negative refractive power. Accordingly, an achromatizing effect can be achieved with the second lens G2 and the third lens G3.

Further, in the imaging lens 5, the fifth lens G5 has negative power in the vicinity of the axis, and accordingly, is effective in correcting aberrations, particularly field curvatures. The fifth lens G5 also has a convex surface at the peripheral portion, and accordingly, is effective in correcting astigmatisms and distortions.

In the following, Table 9 shows the lens data obtained when specific numerical values were applied to the imaging lens 5 of the fifth numerical example according to the embodiment, in conjunction with an F-number FNo, a focal length f of the entire lens system, and a field angle $2\omega$. In Table 9, each curvature radius Ri of $\infty$ means that the plane is a flat plane.

TABLE 9

Lens Data in the Fifth Numerical Example
FNo = 2.4 f = 3.8 $2\omega$ = 72.6°

| Si Plane number | Ri Curvature radius | Di Plane interval | Ndi Refractive index | vdi Abbe number |
|---|---|---|---|---|
| 1 | 2.895 | 0.445 | 1.535 | 56.3 |
| 2 | −14.800 | 0.040 | — | — |
| 3(STO) | $\infty$ | 0.053 | — | — |
| 4 | 11.139 | 0.476 | 1.535 | 56.3 |
| 5 | −4.713 | 0.040 | — | — |
| 6 | 13.787 | 0.300 | 1.615 | 25.6 |
| 7 | 1.991 | 0.635 | — | — |
| 8 | −3.105 | 0.758 | 1.535 | 56.3 |
| 9 | −1.144 | 0.040 | — | — |
| 10 | 1.775 | 0.550 | 1.535 | 56.3 |
| 11 | 0.848 | 0.813 | — | — |
| 12 | $\infty$ | 0.150 | 1.518 | 64.1 |
| 13 | $\infty$ | 0.700 | — | — |

Table 10 shows the third-order, fourth-order, fifth-order, sixth-order, seventh-order, eighth-order, ninth-order, tenth-order, eleventh-order, and twelfth-order aspheric coefficients of aspheric planes in the imaging lens 5 of the fifth numerical example, in conjunction with conic constants "K". In Table 10, "E-02" is an exponential expression using 10 as the base, or represents "$10^{-2}$". For example, "0.12345E-05" represents "$0.12345 \times 10^{-5}$".

TABLE 10

Aspheric Plane Data in the Fifth Numerical Example
FNo = 2.4 f = 3.8 $2\omega$ = 72.6°

| Si Plane number | K Conic constant | Third-order | Fourth-order | Fifth-order | Sixth-order | Seventh-order |
|---|---|---|---|---|---|---|
| 1 | −1.06E+01 | — | 2.60E−02 | — | −4.70E−02 | — |
| 2 | −1.00E+01 | — | −5.46E−02 | — | 1.22E−01 | — |
| 3 (STO) | — | — | — | — | — | — |
| 4 | 1.00E+01 | — | −6.72E−02 | — | 5.67E−02 | — |
| 5 | 9.30E+00 | — | −1.84E−01 | — | 1.44E−01 | — |
| 6 | 1.95E−01 | — | −1.70E−01 | — | 8.69E−02 | — |
| 7 | 1.35E+00 | 1.98E−02 | −7.99E−02 | −1.82E−02 | −9.51E−03 | 8.59E−03 |
| 8 | 1.42E+00 | 2.47E−02 | 1.28E−01 | −8.51E−02 | 1.24E−02 | 1.76E−04 |
| 9 | −5.77E+00 | −1.22E−01 | 3.17E−02 | 8.22E−02 | −9.01E−02 | 4.07E−02 |
| 10 | −4.21E+00 | −1.27E−01 | 1.40E−02 | 1.70E−02 | −4.08E−02 | 2.44E−02 |
| 11 | −4.82E+00 | 1.27E−02 | −9.99E−02 | 4.40E−02 | −3.54E−03 | −2.50E−04 |

| Si Plane number | Eighth-order | Ninth-order | Tenth-order | Eleventh-order | Twelfth-order |
|---|---|---|---|---|---|
| 1 | 6.66E−02 | — | −4.10E−02 | — | — |
| 2 | −1.06E−01 | — | 1.10E−02 | — | — |
| 3 (STO) | — | — | — | — | — |
| 4 | −7.18E−02 | — | −7.57E−02 | — | — |
| 5 | −9.14E−02 | — | −7.72E−03 | — | — |
| 6 | 1.06E−01 | — | −7.10E−02 | — | — |
| 7 | 5.56E−02 | 2.57E−02 | −5.32E−02 | — | — |
| 8 | 4.68E−03 | 1.54E−02 | −3.11E−02 | 1.89E−02 | −3.71E−03 |
| 9 | −1.11E−02 | 5.89E−03 | 4.26E−03 | −2.31E−03 | −7.26E−04 |
| 10 | 4.11E−03 | −5.74E−03 | 1.03E−03 | — | — |
| 11 | −7.38E−04 | −1.82E−04 | 1.51E−04 | — | — |

Figure 10:
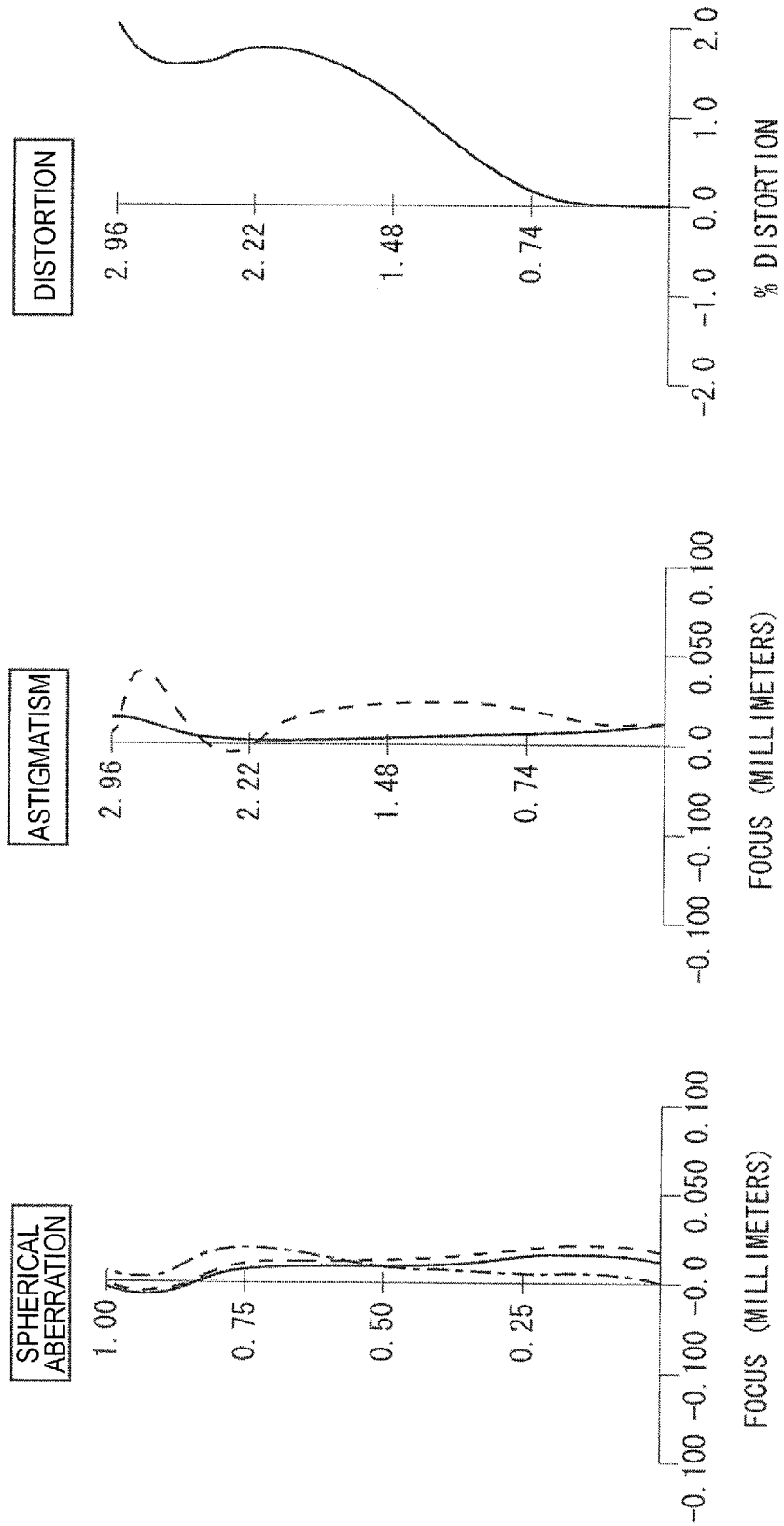
FIG. 10 shows characteristic curves indicating the aberrations in the fifth numerical example.

FIG. 10 shows aberrations in the imaging lens 5 of the fifth numerical example. In the astigmatism graph, the solid line indicates values in a sagittal imaging plane, and the dashed line indicates values in a meridional imaging plane.

As can be seen from the aberration graphs (a spherical aberration graph, an astigmatism graph, and a distortion graph) in FIG. 10, aberrations are appropriately corrected, and excellent imaging performance is achieved by the imaging lens 5 of the fifth numerical example.

[2-6. Sixth Numerical Example]

Figure 11:
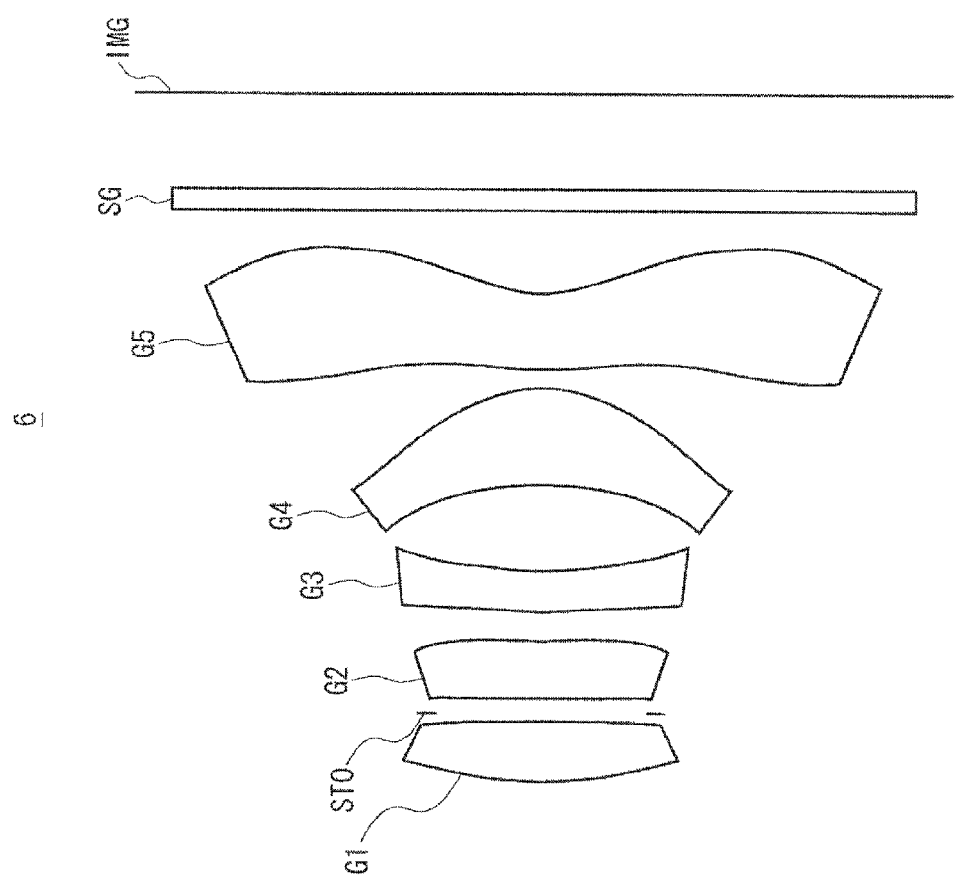
FIG. 11 is a schematic cross-sectional diagram showing the structure of an imaging lens in a sixth numerical example.

In FIG. 11, reference numeral 6 indicates an entire imaging lens in a sixth numerical example. A first lens G1 having positive refractive power, an aperture stop STO, a second lens G2 having positive or negative refractive power, a third lens G3 having negative refractive power, a fourth lens G4 having positive refractive power, and a fifth lens G5 having negative refractive power are provided in this order from the object side. Positive power is forward in the entire lens system.

In the imaging lens 6, sealing glass SG for protecting an imaging plane IMG is provided between the fifth lens G5 and the imaging plane IMG of an imaging element.

In this imaging lens 6, a first lens (not shown) having a four-lens structure is divided into two. While the two divisional lenses (the first lens G1 and the second lens G2) complement each other with power, the number of aberration correction planes is increased by two compared with that prior to the division.

With this arrangement in the imaging lens 6, the first lens G1 and the second lens G2 complement each other with power. Accordingly, a decrease in the curvature radius of the first lens G1 can be restrained, and an increase in the refractive power can also be restrained. Thus, spherical aberration correction can be performed. Also, coma aberration correction can be performed, even if the lens aperture is made larger and Fno is made smaller (brighter) to achieve higher image quality.

Although separated in the imaging lens 6, the first lens G1 and the second lens G2 are located very close to each other, so that chromatic aberrations that have occurred in the first lens G1 and the second lens G2 can be offset by the third lens G3.

In the imaging lens 6, the aperture stop STO is provided between the first lens G1 and the second lens G2 that are separated. Accordingly, distortions can be more efficiently corrected than in a case where the aperture stop STO is located closer to the object side than the first lens G1 is. This also contributes to a decrease in optical sensitivity, and assembling becomes easier in the manufacturing procedures.

Further, in the imaging lens 6, the first lens G1 has a convex surface facing the object side and has positive refractive power. Accordingly, an achromatizing effect can be achieved with the first lens G1, the second lens G2, and the third lens G3, while the refractive power is increased.

In the imaging lens 6, the third lens G3 has a concave surface on the imaging plane side. Accordingly, even when an off-axis light beam is totally-reflected by the concave surface, the totally-reflected off-axis light beam diffuses to the lens peripheral portion and is prevented from directly entering the imaging plane IMG of a solid-state imaging element such as a CCD or CMOS. Thus, formation of ghosts can be prevented.

In the imaging lens 6, the third lens G3 has the concave surface on the imaging plane side, to effectively correct field curvatures and coma aberrations. Further, in the imaging lens 1, the fourth lens G4 has a meniscus shape with positive power, to effectively correct aberrations, particularly field curvatures and astigmatisms.

Further, in the imaging lens 6, the second lens G2 has a convex surface facing the imaging plane side and has positive or negative refractive power. Accordingly, an achromatizing effect can be achieved with the second lens G2 and the third lens G3.

Further, in the imaging lens 6, the fifth lens G5 has negative power in the vicinity of the axis, and accordingly, is effective in correcting aberrations, particularly field curvatures. The fifth lens G5 also has a convex surface at the peripheral portion, and accordingly, is effective in correcting astigmatisms and distortions.

In the following, Table 11 shows the lens data obtained when specific numerical values were applied to the imaging lens 6 of the sixth numerical example according to the embodiment, in conjunction with an F-number FNo, a focal length f of the entire lens system, and a field angle 2ω. In Table 12, each curvature radius Ri of ∞ means that the plane is a flat plane.

TABLE 11

Lens Data in the Sixth Numerical Example
FNo = 2.4 f = 3.8 2ω = 72.4°

| Si Plane number | Ri Curvature radius | Di Plane interval | Ndi Refractive index | νdi Abbe number |
|---|---|---|---|---|
| 1 | 2.859 | 0.438 | 1.535 | 56.3 |
| 2 | −21.025 | 0.064 | — | — |
| 3(STO) | ∞ | 0.100 | — | — |
| 4 | 15.053 | 0.425 | 1.535 | 56.3 |
| 5 | 10.644 | 0.204 | — | — |
| 6 | 3.562 | 0.300 | 1.615 | 25.6 |
| 7 | 3.142 | 0.621 | — | — |
| 8 | −2.398 | 0.707 | 1.535 | 56.3 |
| 9 | −1.000 | 0.137 | — | — |
| 10 | 2.565 | 0.550 | 1.535 | 56.3 |
| 11 | 0.866 | 0.605 | — | — |
| 12 | ∞ | 0.150 | 1.518 | 64.1 |
| 13 | ∞ | 0.700 | — | — |

Table 12 shows the third-order, fourth-order, fifth-order, sixth-order, seventh-order, eighth-order, ninth-order, and tenth-order aspheric coefficients of aspheric planes in the imaging lens 6 of the sixth numerical example, in conjunction with conic constants "K". In Table 12, "E-02" is an exponential expression using 10 as the base, or represents "$10^{-2}$". For example, "0.12345E-05" represents "$0.12345 \times 10^{-5}$".

TABLE 12

Aspheric Plane Data in the Sixth Numerical Example
FNo = 2.4 f = 3.8 2ω = 72.4°

| Si Plane number | K Conic constant | Third-order | Fourth-order | Fifth-order | Sixth-order | Seventh-order |
|---|---|---|---|---|---|---|
| 1 | −1.06E+01 | — | 3.27E−02 | — | −4.54E−02 | — |
| 2 | −1.00E+01 | — | −2.99E−02 | — | 5.78E−02 | — |
| 3 (STO) | — | — | — | — | — | — |
| 4 | 1.00E+01 | — | −5.52E−02 | — | 5.60E−02 | — |

TABLE 12-continued

Aspheric Plane Data in the Sixth Numerical Example
FNo = 2.4 f = 3.8 2ω = 72.4°

| 5 | 9.30E+00 | — | −2.11E−01 | — | 1.20E−01 | — |
|---|---|---|---|---|---|---|
| 6 | 1.95E−01 | — | −2.00E−01 | — | 5.03E−02 | — |
| 7 | 1.35E+00 | 7.35E−03 | −8.12E−02 | −5.63E−03 | 3.60E−03 | 1.06E−02 |
| 8 | 1.42E+00 | 1.78E−02 | 5.58E−02 | −7.01E−02 | 2.84E−02 | −1.25E−02 |
| 9 | −4.35E+00 | −1.12E−01 | −3.40E−02 | 8.30E−02 | −7.74E−02 | 4.46E−02 |
| 10 | −4.21E+00 | −1.73E−01 | 1.68E−02 | 2.70E−02 | −3.92E−02 | 2.34E−02 |
| 11 | −4.82E+00 | −6.62E−02 | −1.74E−02 | 1.19E−02 | −1.17E−03 | 4.19E−06 |

| Si Plane number | Eighth- order | Ninth- order | Tenth- order | Eleventh- order | Twelfth- order |
|---|---|---|---|---|---|
| 1 | 5.74E−02 | — | −3.73E−02 | — | — |
| 2 | −3.36E−02 | — | −2.13E−02 | — | — |
| 3 (STO) | — | — | — | — | — |
| 4 | −3.22E−02 | — | −8.67E−02 | — | — |
| 5 | −8.30E−02 | — | −6.76E−03 | — | — |
| 6 | 9.59E−02 | — | −4.41E−02 | — | — |
| 7 | 4.10E−02 | 1.71E−02 | −2.35E−02 | — | — |
| 8 | −1.72E−02 | 1.01E−02 | −1.30E−02 | 3.32E−02 | −2.16E−02 |
| 9 | −1.62E−02 | −7.20E−04 | 5.28E−04 | −1.57E−03 | 3.10E−03 |
| 10 | 3.65E−03 | −5.80E−03 | 1.10E−03 | — | — |
| 11 | −1.68E−04 | −2.05E−04 | 8.62E−05 | — | — |

Figure 12:
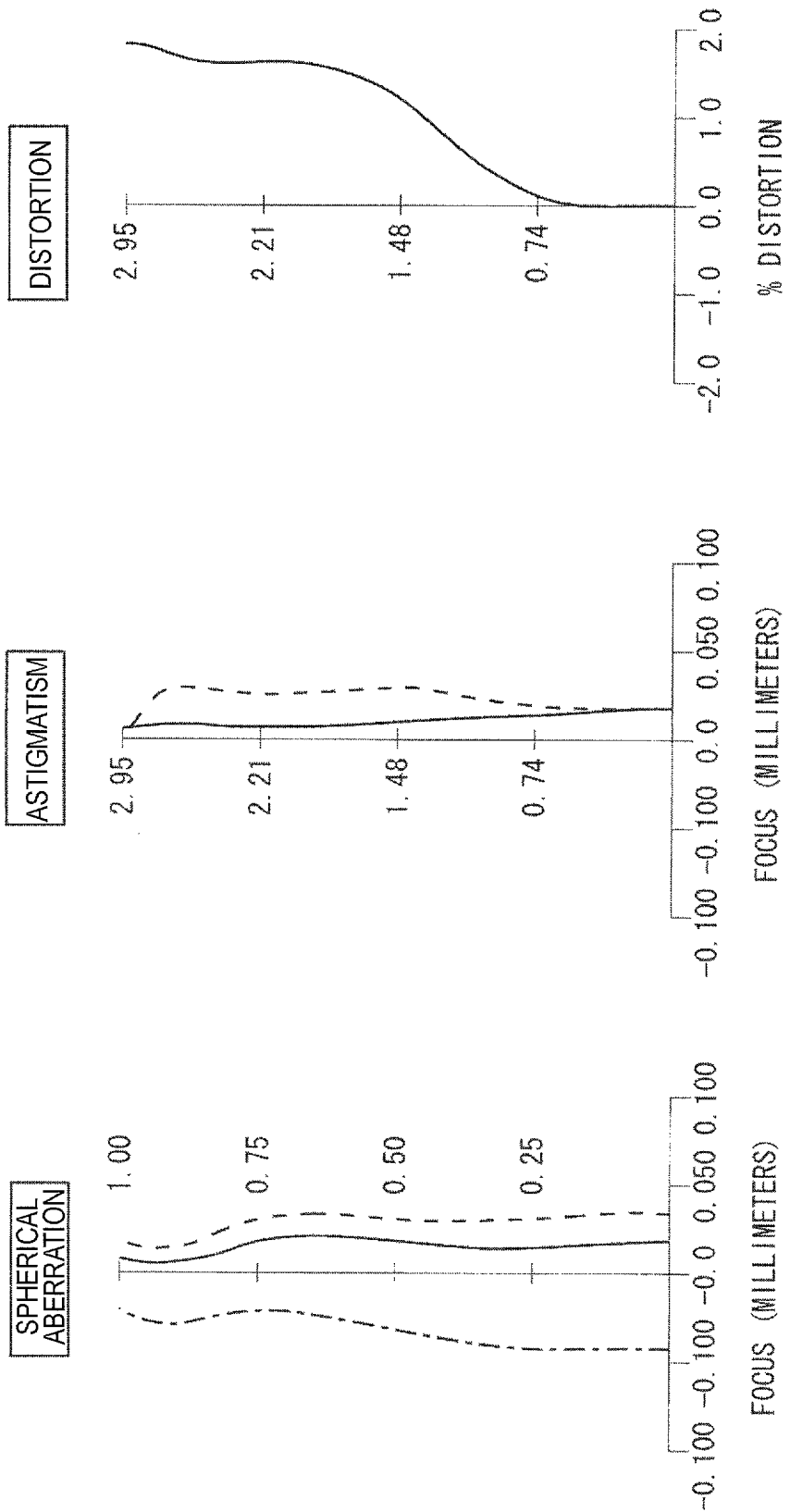
FIG. 12 shows characteristic curves indicating the aberrations in the sixth numerical example.

FIG. 12 shows aberrations in the imaging lens 6 of the sixth numerical example. In the astigmatism graph, the solid line indicates values in a sagittal imaging plane, and the dashed line indicates values in a meridional imaging plane.

As can be seen from the aberration graphs (a spherical aberration graph, an astigmatism graph, and a distortion graph) in FIG. 12, aberrations are appropriately corrected, and excellent imaging performance is achieved by the imaging lens 6 of the sixth numerical example.

[2-7. Numerical Values According to the Respective Conditional Expressions]

Table 13 shows respective numerical values according to the conditional expressions (1) through (4) for the imaging lenses 1 through 6 described in the first through sixth numerical examples, and Table 14 shows the respective numerical values that support those conditional expressions in the first through sixth numerical examples.

TABLE 13

Numerical Values According to the Conditional Expressions

| Conditional expression | First numerical example | Second numerical example | Third numerical example | Fourth numerical example | Fifth numerical example | Sixth numerical example |
|---|---|---|---|---|---|---|
| (1) 0.80 < f1/f < 1.40 | 1.30 | 1.18 | 1.23 | 0.87 | 1.19 | 1.23 |
| (2) f1/|f3| < 1.50 | 1.07 | 0.60 | 0.79 | 0.55 | 1.20 | 0.08 |
| (3) −0.20 < f1/f2 < 0.90 | 0.66 | 0.26 | 0.42 | 0.01 | 0.73 | −0.07 |
| (3) (νd1 + νd2)/2 − νd3 > 20 | 26.00 | 46.07 | 30.71 | 30.71 | 30.71 | 46.07 |
| (4) 0.50 < |f5|/f < 1.80 | 1.02 | 1.06 | 0.94 | 1.28 | 1.00 | 0.72 |

TABLE 14

Numerical Values Supporting the Conditional Expressions

| | First numerical example | Second numerical example | Third numerical example | Fourth numerical example | Fifth numerical example | Sixth numerical example |
|---|---|---|---|---|---|---|
| Focal length of entire lens system f | 3.615 | 3.882 | 3.814 | 4.073 | 3.819 | 3.836 |
| Focal length of first lens f1 | 4.693 | 4.567 | 4.709 | 3.542 | 4.546 | 4.734 |
| Focal length of second lens f2 | 7.115 | 17.422 | 11.334 | 300.000 | 6.229 | −70.288 |
| Focal length of third lens f3 | −4.372 | −7.662 | −5.938 | −6.489 | −3.788 | −59.269 |

TABLE 14-continued

Numerical Values Supporting the Conditional Expressions

|  | First numerical example | Second numerical example | Third numerical example | Fourth numerical example | Fifth numerical example | Sixth numerical example |
|---|---|---|---|---|---|---|
| Focal length of fifth lens f5 | −3.698 | −4.106 | −3.596 | −5.196 | −3.816 | −2.744 |
| Abbe number of first lens vd1 | 55.90 | 71.68 | 56.32 | 56.32 | 56.32 | 71.68 |
| Abbe number of second lens vd2 | 55.90 | 71.68 | 56.32 | 56.32 | 56.32 | 71.68 |
| Abbe number of third lens vd3 | 29.90 | 25.61 | 25.61 | 25.61 | 25.61 | 25.61 |

As can be seen from Table 13, "$f_1/f$" according to the conditional expression (1) has a minimum value of "0.87" and a maximum value of "1.30", which fall within the numerical range, $0.8 < f_1/f < 1.40$, defined as the conditional expression (1).

Also, as can be seen from Table 13, "$f_1/|f_3|$" according to the conditional expression (2) has a maximum value of "1.20", which falls within the numerical range, $f_1/|f_3| < 1.50$, defined as the conditional expression (2).

Further, as can be seen from Table 13, "$f_1/f_2$" according to the conditional expression (3) has a minimum value of "−0.07" and a maximum value of "0.66", which fall within the numerical range, $-0.20 < f_1/f_2 < 0.90$, defined as the conditional expression (3).

Further, as can be seen from Table 13, "$(vd_1+vd2)/2-vd_3$" according to the conditional expression (4) has a minimum value of "26.00", which falls within the numerical range, $(vd_1+vd2)/2-vd_3 > 20$, defined as the conditional expression (4).

Further, as can be seen from Table 13, "$|f_5|/f$" according to the conditional expression (5) has a minimum value of "0.72" and a maximum value of "1.28", which fall within the numerical range, $0.5 < |f_5|/f < 1.80$, defined as the conditional expression (5).

Accordingly, in the imaging lenses 1 through 6 in the first through sixth numerical examples, all the above mentioned conditional expressions (1) through (5) are satisfied, and, as shown in the respective aberration graphs, the respective aberrations of spherical aberrations, astigmatisms, and distortions can be corrected in a balanced manner.

3. Structures of an Imaging Device and a Portable Telephone Device

[3-1. Structure of an Imaging Device]

The following is a description of an imaging device formed by combining an imaging lens of the present invention and an imaging element such as a CCD (Charge Coupled Device) sensor or a CMOS (Complementary Metal Oxide Semiconductor) sensor for converting an optical image formed by the imaging lens into an electrical signal.

In the following explanation, the imaging lens 1 of the above described first numerical example is applied to the imaging device. However, any of the imaging lenses 2 through 6 of the above described second through sixth numerical examples can also be applied to the imaging device.

In the imaging lens 1 (FIG. 1) provided in this imaging device, a first lens G1 having positive refractive power, an aperture stop STO, a second lens G2 having positive or negative refractive power, a third lens G3 having negative refractive power, a fourth lens G4 having positive refractive power, and a fifth lens G5 having negative refractive power are provided in this order from the object side, and positive power is forward in the entire lens system.

In this imaging lens 1, if the total optical length is shortened to reduce the size, the curvature radius of a first lens (not shown) having a four-lens structure becomes smaller, and the refractive power increases. As a result, spherical aberration correction becomes difficult. Also, in the imaging lens, if the lens aperture is made larger and Fno is made smaller (brighter) to achieve higher image quality, coma aberration correction becomes difficult.

To effectively correct spherical aberrations and coma aberrations that become larger as the size increases and the aperture becomes larger, the first lens having a four-lens structure is divided into two in the imaging lens 1. While the two divisional lenses (the first lens G1 and the second lens G2) complement each other with power, the number of aberration correction planes is increased by two compared with that prior to the division.

With this arrangement in the imaging lens 1, spherical and coma aberrations that have occurred in the first lens G1 are restrained by the second lens G2, and other aberrations can also be corrected by the two newly-formed correction planes.

Although separated in the imaging lens 1, the first lens G1 and the second lens G2 are located very close to each other, so that chromatic aberrations that have occurred in the first lens G1 and the second lens G2 can be offset by the third lens G3.

In the imaging lens 1, the aperture stop STO is provided between the first lens G1 and the second lens G2 that are separated. Accordingly, distortions can be more efficiently corrected than in a case where the aperture stop STO is located closer to the object side than the first lens G1 is. This also contributes to a decrease in optical sensitivity, and assembling becomes easier in the manufacturing procedures.

Also, in this imaging lens 1, it is preferable to satisfy the following conditional expressions (1), (2), and (3):

$$0.80 < f_1/f < 1.40, \quad (1)$$

$$f_1/|f_3| < 1.50, \text{ and} \quad (2)$$

$$-0.20 < f_1/f_2 < 0.90, \quad (3)$$

where
f: the focal length of the entire lens system,
$f_1$: the focal length of the first lens,
$f_2$: the focal length of the second lens, and
$f_3$: the focal length of the third lens.

The conditional expression (1) specified for the imaging lens 1 is a conditional expression for specifying an appropriate power allocation to the first lens G1 relative to the power of the entire lens system in such a lens structure.

If the upper limit value defined by the conditional expression (1) is exceeded, the power of the first lens G1 becomes too large, and off-axis aberration correction, particularly astigmatism and field curvature correction, becomes difficult. As a result, easiness of assembling at the time of manufacture is reduced.

If the lower limit value defined by the conditional expression (1) is not reached, on the other hand, the power of the first lens G1 becomes too weak to shorten the total optical length, and compactness might be reduced. In view of this, satisfying the conditional expression (1) is an essential condition in shortening the total optical length in the imaging lens 1.

The conditional expression (2) specified for this imaging lens 1 concerns appropriate power allocations to the first lens G1 and the third lens G3. An absolute value is used as the focal length of the third lens G3, because the third lens G3 has negative power.

If the lower limit value defined by the conditional expression (2) is not reached, the power of the first lens G1 becomes too strong. As a result, spherical aberration and off-axis coma aberration occurrences increase, and aberration correction becomes difficult.

If the upper limit value defined by the conditional expression (2) is exceeded, on the other hand, the power of the first lens G1 becomes too weak to allow the first lens G1 and the third lens G3 to perform appropriate achromatizing. As a result, optical performance high enough for high-pixel imaging elements cannot be maintained. Also, in an imaging environment where a strong power source exists, color bleeding (flare) occurs, to adversely affect image quality.

Therefore, in the imaging lens 1, the conditional expression (2) is satisfied, so that the imaging lens is made even thinner than a conventional lens, and optical performance high enough for high-pixel imaging elements can be achieved.

Further, the conditional expression (3) specified for this imaging lens 1 is a conditional expression that concerns appropriate power allocations to the first lens G1 and the second lens G2.

If the lower limit value defined by this conditional expression (3) is not reached, the power of the second lens G2 becomes too weak, and a large proportion of the load is put on the first lens G1. As a result, spherical aberration and off-axis coma aberration occurrences increase, and correcting the spherical aberration and the off-axis coma aberration becomes difficult. This also hinders achromatizing with the third lens G3, and therefore, optical performance high enough for high-pixel imaging elements cannot be maintained.

If the upper limit value defined by the conditional expression (3) is exceeded, on the other hand, the power of the second lens G2 becomes too strong. As a result, sensitivity in manufacture becomes higher, and easiness of assembling is reduced at the time of manufacture.

Therefore, in the imaging lens 1, the conditional expression (3) is satisfied, so that optical performance high enough for high-pixel imaging elements can be achieved while the power allocations to the first lens G1 and the second lens G2 are optimized.

Further, in this imaging lens 1, it is preferable to satisfy the following conditional expression (4):

$$(vd_1 + vd_2)/2 - vd_3 > 20 \quad (4)$$

where
$vd_1$: the Abbe number of the first lens,
$vd_2$: the Abbe number of the second lens, and
$vd_3$: the Abbe number of the third lens.

This conditional expression (4) defines the Abbe numbers of the first through third lenses G1 through G3 at a d-line single wavelength. Such a glass material that the Abbe number falls within the range defined by the conditional expression (4) is used for each of the first lens G1, the second lens G2, and the third lens G3 in the imaging lens 1, so that excellent chromatic aberration correction can be performed without a large increase in the power of each lens.

If the lower limit value defined by the conditional expression (4) is not reached in the imaging lens 1, color bleeding (flare) occurs to adversely affect image quality. If the conditional expression (4) is satisfied, the power of each lens does not become very strong. Accordingly, coma aberration and field curvature occurrences can be restrained in the surrounding area, and furthermore, sensitivity in manufacture can be effectively restrained.

Therefore, in the imaging lens 1, the conditional expression (4) is satisfied, so that excellent chromatic aberration correction can be performed, and coma aberration and field curvature occurrences are restrained in the surrounding area to lower the sensitivity in manufacture.

Further, in the imaging lens 1, the relationship between the focal length of the entire lens system and the focal length of the fifth lens G5 satisfies the following conditional expression (5):

$$0.5 < |f_5|/f < 1.8 \quad (5)$$

where
f: the focal length of the entire lens system, and
$f_5$: the focal length of the fifth lens.

The conditional expression (5) specified for this imaging lens 1 is a conditional expression that concerns an appropriate power allocation to the fifth lens G5 relative to the power of the entire lens system.

If the lower limit value defined by the conditional expression (5) is not reached, the power of the fifth lens G5 becomes too strong. As a result, appropriate field correction (correction to achieve uniform resolving power from the axis to the surrounding area) becomes difficult. Also, optical sensitivity becomes higher, and easiness of assembling is reduced in manufacture.

If the upper limit value defined by the conditional expression (5) is exceeded, on the other hand, the power of the fifth lens G5 becomes too weak, and appropriate aberration correction, particularly field correction (according to the Petzval's law), becomes difficult.

Therefore, in the imaging lens 1, the conditional expression (5) is satisfied, so that optical performance high enough for high-pixel imaging elements can be achieved while the power allocation to the fifth lens G5 relative to the entire lens system is optimized.

Also, in the imaging lens 1, the first lens G1 has a convex surface facing the object side and has positive refractive power. Accordingly, an achromatizing effect can be achieved with the first lens G1, the second lens G2, and the third lens G3, while the refractive power is increased.

In the imaging lens 1, the third lens G3 has a concave surface on the imaging plane side. Accordingly, even when an off-axis light beam is totally-reflected by the concave surface, the totally-reflected off-axis light beam diffuses to the lens peripheral portion and is prevented from directly entering a solid-state imaging element such as a CCD or CMOS. Thus, formation of ghosts can be prevented.

In the imaging lens 1, the third lens G3 has the concave surface on the imaging plane side, to effectively correct field curvatures and coma aberrations. Further, in the imaging lens 1, the fourth lens G4 has a meniscus shape with positive power, to effectively correct aberrations, particularly field curvatures and astigmatisms.

Further, in the imaging lens 1, the second lens G2 has a convex surface facing the imaging plane side and has positive or negative refractive power. Accordingly, an achromatizing effect can be achieved with the second lens G2 and the third lens G3.

Further, in the imaging lens 1, the fifth lens G5 has negative power in the vicinity of the axis, and accordingly, is effective in correcting aberrations, particularly field curvatures. At the same time, the fifth lens G5 also has a convex surface at the peripheral portion, and accordingly, is effective in correcting astigmatisms and distortions.

In the imaging lens 1, the above described conditions are satisfied, so that contrast degradation due to ghosts and flares can be reduced, and optical performance high enough for high-pixel imaging elements can be achieved, while the imaging lens is made very small and thin.

[3-2. Structure of a Portable Telephone Device Having an Imaging Device Mounted Thereon]

Next, a portable telephone device having an imaging device of the present invention mounted thereon is described.

Figure 13:
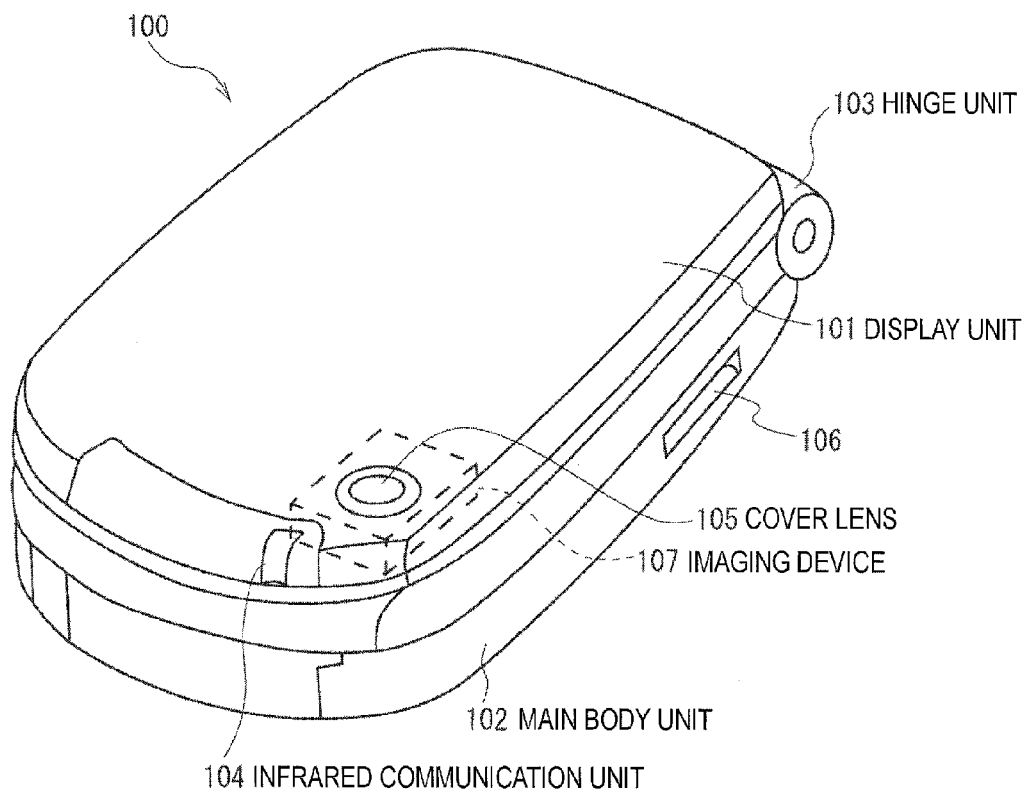
FIG. 13 is a schematic perspective diagram showing an external appearance of a portable telephone device on which an imaging device of the present invention is mounted.
Figure 14:
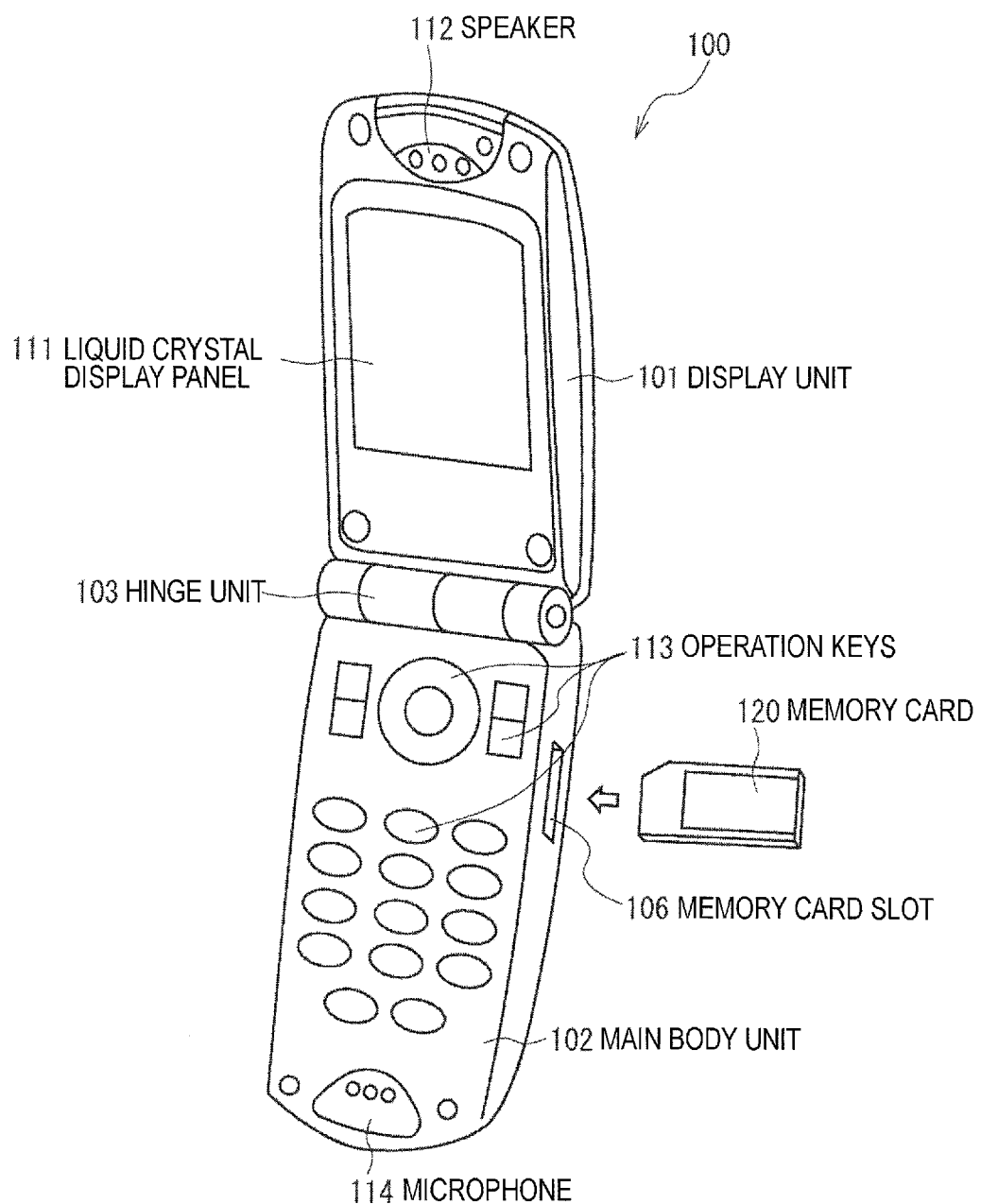
FIG. 14 is a schematic perspective diagram showing an external appearance of the portable telephone device on which the imaging device of the present invention is mounted.
Figure 15:
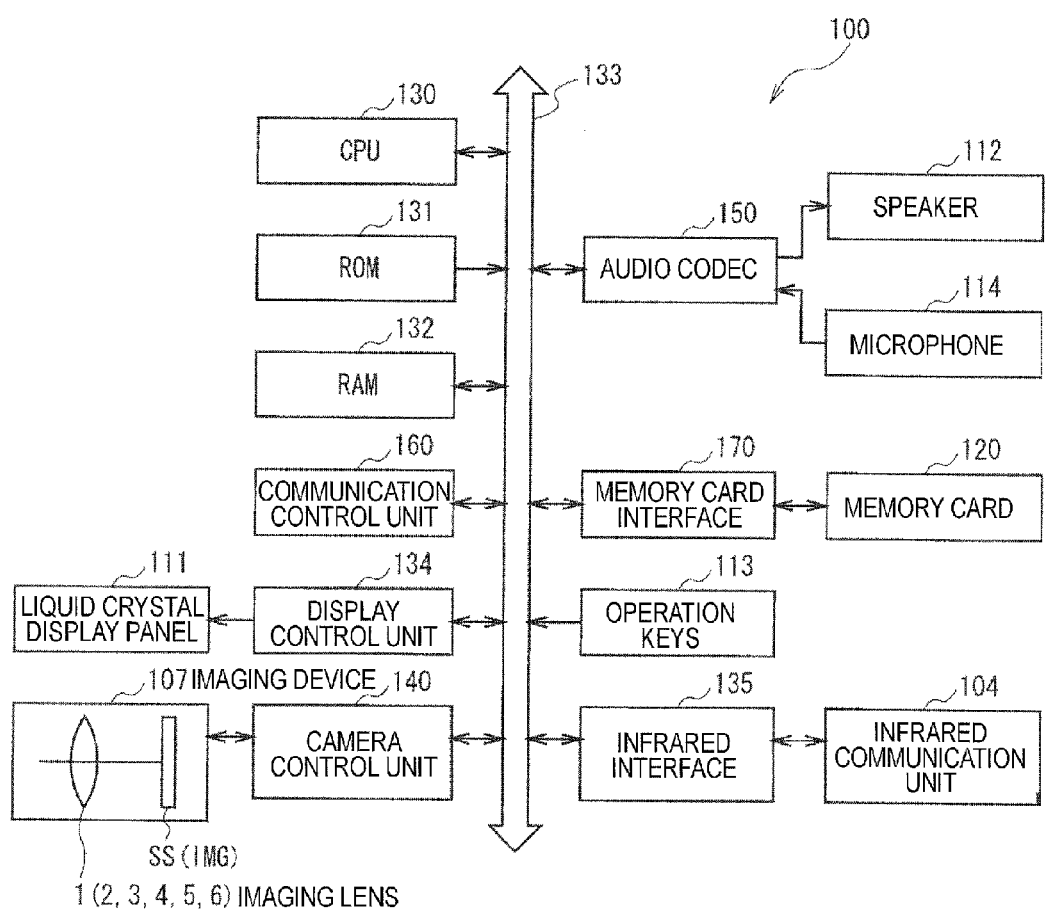
FIG. 15 is a schematic block diagram showing the circuit configuration of the portable telephone device.

As shown in FIGS. 13 and 14, a portable telephone device 100 has a display unit 101 and a main body unit 102 foldably connected to each other via a hinge unit 103. When being carried around, the display unit 101 and the main body unit 102 are in a folded state (FIG. 13). During a call, the display unit 101 and the main body unit 102 are in an opened state (FIG. 14).

A liquid crystal display panel 111 is provided on one of the surfaces of the display unit 101, and a speaker 112 is provided above the liquid crystal display panel 111. An imaging device 107 is incorporated into the display unit 101, and an infrared communication unit 104 for performing infrared wireless communication is provided at the top end of the imaging device 107.

Also, a cover lens 105 located on the object side of the first lens in the imaging device 107 is provided on the other surface of the display unit 101.

Various operation keys 113 such as numeric keys and a power key are provided on one of the surfaces of the main body unit 102, and a microphone 114 is provided at the lower end of the main body unit 102. A memory card slot 106 is formed in a side surface of the main body unit 102, so that a memory card 120 can be inserted and detached to and from the memory card slot 106.

As shown in FIG. 13, the portable telephone device 100 includes a CPU (Central Processing Unit) 130, so that a control program stored in a ROM (Read Only Memory) 131 is loaded into a RAM (Random Access Memory) 132, and the entire portable telephone device 100 is integrally controlled via a bus 133.

The portable telephone device 100 includes a camera control unit 140, and controls the imaging device 107 via the camera control unit 140, to capture still images or moving images.

The camera control unit 140 performs a compression process compliant with JPEG (Joint Photographic Experts Group) or MPEG (Moving Picture Expert Group) on image data obtained by capturing images through the imaging device 107. The resultant image data is transmitted to the CPU 130, a display control unit 134, a communication control unit 160, a memory card interface 170, or an infrared interface 135 via the bus 133.

This imaging device 107 is formed by combining one of the imaging lenses 1 through 6 of the first through sixth numerical examples and an imaging element SS formed with a CCD sensor, a CMOS sensor, or the like.

In the portable telephone device 100, the CPU 130 temporarily stores image data supplied from the camera control unit 140 into the RAM 132, or stores the image data into the memory card 120 via the memory card interface 170 where necessary, or outputs the image data to the liquid crystal display panel 111 via the display control unit 134.

Also, in the portable telephone device 100, audio data recorded through the microphone 114 at the same time as image capturing is temporarily stored into the RAM 132 via an audio codec 150, or is stored into the memory card 120 through the memory card interface 170 where necessary, or is output from the speaker 112 via the audio codec 150 at the same time as displaying of an image on the liquid crystal display panel 111.

The portable telephone device 100 is designed to output image data and audio data to the outside via the infrared interface 135 and the infrared communication unit 104, and transmit the image data and the audio data to another electronic device having an infrared communication function, such as a portable telephone device, a personal computer, or a PDA (Personal Digital Assistant).

In a case where a moving image or a still image is to be displayed on the liquid crystal display panel 111 based on image data stored in the RAM 132 or the memory card 120 in the portable telephone device 100, the image data is decoded or decompressed by the camera control unit 140, and is then output to the liquid crystal display panel 111 via the display control unit 134.

The communication control unit 160 is designed to transmit and receive radio waves to and from base stations via an antenna (not shown), and, in a voice communication mode, perform predetermined processing on received audio data and then output the audio data to the speaker 112 via the audio codec 150.

The communication control unit 160 is also designed to perform predetermined processing on audio signals collected by the microphone 114 via the audio codec 150, and then transmit the audio signals through the antenna (not shown).

In this imaging device 107, the incorporated one of the imaging lenses 1 through 6 can have a smaller size and a larger aperture while shortening the total optical length as described above. Accordingly, this imaging device 107 is advantageous when mounted on an electronic device required to be smaller in size, such as a portable telephone device.

4. Other Embodiments

It should be noted that the specific shapes, structures, and numerical values mentioned in the above described embodiments and the first through sixth numerical examples are merely examples for carrying out the present invention, and do not limit the technical scope of the invention.

In the above described embodiments, the specific numerical values shown in Table 13 are used based on the first through sixth numerical examples. However, the present invention is not limited to those embodiments, and other various specific shapes, structures, and numerical values may be used within the range satisfying the conditional expressions (1) through (5).

Also, in the above described embodiments, the imaging lens has the above described power layout, and is designed to satisfy the conditional expressions (1) through (5). However, the present invention is not limited to that, and the imaging lens may have the above described power layout and satisfy only the conditional expressions (1), (2), (3), and (5).

Further, in the above described embodiments, the first lens used in the imaging lens has a convex surface facing the object side, and has positive refractive power. However, the present invention is not limited to that, and a first lens that has a concave surface facing the object side and has positive refractive power may be used.

Further, in the above described embodiment, the portable telephone device 100 has been described as an example of an electronic device having an imaging lens mounted thereon. However, specific examples of imaging devices are not limited to that, and the present invention can be applied to other various electronic devices such as digital still cameras, digital video cameras, personal computers equipped with cameras, and PDAs having cameras incorporated thereinto.

REFERENCE SIGNS LIST 1, 2, 3, 4, 5, 6 ... Imaging lens, G1 ... First lens, G2 ... Second lens, G3 ... Third lens, G4 ... Fourth lens, G5 ... Fifth lens, SG ... Sealing glass, IMG ... Imaging plane, 100 ... Portable telephone device, 101 ... Display unit, 102 ... Main body unit, 103 ... Hinge unit, 104 ... Infrared communication unit, 105 ... Cover lens, 106 ... Memory card slot, 107 ... Imaging device, 111 ... Liquid crystal display panel, 112 ... Speaker, 113 ... Operation keys, 114 ... Microphone, 120 ... Memory card, 130 ... CPU, 131 ... ROM, 132 ... RAM, 134 ... Display control unit, 135 ... Infrared interface, 140 ... Camera control unit, 150 ... Audio codec, 160 ... Communication control unit, 170 ... Memory card interface

The invention claimed is:

1. An imaging lens comprising, in order from an object side, a first lens having positive refractive power, an aperture stop, a second lens having positive or negative refractive power, a third lens having negative refractive power, a fourth lens having positive refractive power, and a fifth lens having negative refractive power, the imaging lens satisfying the following conditional expressions (1), (2), and (3):

$$0.80 < f_1/f < 1.40, \quad (1)$$

$$f_1/|f_3| < 1.50, \text{ and} \quad (2)$$

$$-0.20 < f_1/f_2 < 0.90 \quad (3)$$

where
f represents a focal length of the entire lens system,
$f_1$ represents a focal length of the first lens,
$f_2$ represents a focal length of the second lens, and
$f_3$ represents a focal length of the third lens.

2. The imaging lens according to claim 1, wherein the following conditional expression (4) is satisfied:

$$(vd_1 + vd_2)/2 - vd_3 > 20 \quad (4)$$

where
$vd_1$ represents an Abbe number of the first lens,
$vd_2$ represents an Abbe number of the second lens, and
$vd_3$ represents an Abbe number of the third lens.

3. The imaging lens according to claim 1, wherein a relationship between the focal length of the entire lens system and a focal length of the fifth lens satisfies the following conditional expression (5):

$$0.5 < |f_5|/f < 1.8 \quad (5)$$

where
f represents the focal length of the entire lens system, and
$f_5$ represents the focal length of the fifth lens.

4. The imaging lens according to claim 1, wherein the first lens has a convex surface facing the object side.

5. The imaging lens according to claim 1, wherein the third lens has a concave surface facing an imaging plane side.

6. The imaging lens according to claim 1, wherein the second lens has a convex surface facing an imaging plane side.

7. An imaging device comprising an imaging lens, and an imaging element configured to convert an optical image formed by the imaging lens into an electrical signal,
wherein the imaging lens comprises, in order from an object side, a first lens having positive refractive power, an aperture stop, a second lens having positive or negative refractive power, a third lens having negative refractive power, a fourth lens having positive refractive power, and a fifth lens having negative refractive power, the imaging lens satisfying the following conditional expressions (1), (2), and (3):

$$0.80 < f_1/f < 1.40, \quad (1)$$

$$f_1/|f_3| < 1.50, \text{ and} \quad (2)$$

$$-0.20 < f_1/f_2 < 0.90, \quad (3)$$

where
f represents a focal length of an entire lens system,
$f_1$ represents a focal length of the first lens,
$f_2$ represents a focal length of the second lens, and
$f_3$ represents a focal length of the third lens.

* * * * *